United States Patent
Paluri et al.

(10) Patent No.: US 12,532,006 B2
(45) Date of Patent: Jan. 20, 2026

(54) SCALING LIST DATA-BASED IMAGE OR VIDEO CODING

(71) Applicant: LG Electronics Inc., Seoul (KR)

(72) Inventors: Seethal Paluri, Seoul (KR); Seunghwan Kim, Seoul (KR); Jie Zhao, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/825,388

(22) Filed: Sep. 5, 2024

(65) Prior Publication Data

US 2024/0430461 A1    Dec. 26, 2024

Related U.S. Application Data

(63) Continuation of application No. 18/135,291, filed on Apr. 17, 2023, now Pat. No. 12,113,992, which is a continuation of application No. 17/852,096, filed on Jun. 28, 2022, now Pat. No. 11,653,008, which is a continuation of application No. 17/570,857, filed on Jan. 7, 2022, now Pat. No. 11,425,401, which is a continuation of application No. PCT/KR2020/008953, filed on Jul. 8, 2020.

(60) Provisional application No. 62/871,228, filed on Jul. 8, 2019.

(51) Int. Cl.
| H04N 19/30 | (2014.01) |
| H04N 19/124 | (2014.01) |
| H04N 19/132 | (2014.01) |
| H04N 19/174 | (2014.01) |
| H04N 19/176 | (2014.01) |
| H04N 19/18 | (2014.01) |
| H04N 19/70 | (2014.01) |

(52) U.S. Cl.
CPC .......... *H04N 19/30* (2014.11); *H04N 19/124* (2014.11); *H04N 19/132* (2014.11); *H04N 19/174* (2014.11); *H04N 19/176* (2014.11); *H04N 19/18* (2014.11); *H04N 19/70* (2014.11)

(58) Field of Classification Search
CPC .... H04N 19/30; H04N 19/124; H04N 19/132; H04N 19/174; H04N 19/176; H04N 19/18; H04N 19/70
See application file for complete search history.

(56) References Cited

U.S. PATENT DOCUMENTS

| 2015/0195573 A1* | 7/2015 | Aflaki Beni | H04N 19/513 |
| | | | 375/240.16 |
| 2015/0264404 A1* | 9/2015 | Hannuksela | H04N 19/30 |
| | | | 375/240.16 |
| 2022/0094936 A1* | 3/2022 | Lai | H04N 19/70 |

* cited by examiner

*Primary Examiner* — Jae N Noh
(74) *Attorney, Agent, or Firm* — Fish & Richardson P.C.

(57) ABSTRACT

According to the disclosure of the present document, scaling list data transferred from an adaptation parameter set (APS) can be signaled through a hierarchical structure, and restrictions are placed on the scaling list data transferred from the APS, whereby the amount of data to be signaled for video/image coding can be reduced, and easiness in implementation can be provided.

3 Claims, 11 Drawing Sheets

SCALING LIST DATA-BASED IMAGE OR VIDEO CODING

CROSS-REFERENCE TO RELATED APPLICATIONS

This application is a continuation of U.S. application Ser. No. 18/135,291, filed on Apr. 17, 2023, which is a continuation of U.S. application Ser. No. 17/852,096, filed on Jun. 28, 2022, now U.S. Pat. No. 11,653,008, which is a continuation of U.S. application Ser. No. 17/570,857, filed on Jan. 7, 2022, now U.S. Pat. No. 11,425,401, which is a continuation pursuant to 35 U.S.C. § 119 (e) of International Application PCT/KR2020/008953, with an international filing date of Jul. 8, 2020, which claims the benefit of U.S. Provisional Patent Application No. 62/871,228, filed on Jul. 8, 2019, the contents of which are hereby incorporated by reference herein in their entirety.

BACKGROUND OF THE DISCLOSURE

Field of the Disclosure

The present technology relates to video or image coding. For example, the present technology relates to a scaling list data-based coding technology.

Related Art

The demands for high-resolution and high-quality images and video, such as an ultra high definition (UHD) image and video of 4K or 8K or more, are recently increasing in various fields. As image and video data become high resolution and high quality, the amount of information or the number of bits that is relatively transmitted is increased compared to the existing image and video data. Accordingly, if image data is transmitted using a medium, such as the existing wired or wireless wideband line, or image and video data are stored using the existing storage medium, transmission costs and storage costs are increased.

Furthermore, interests and demands for immersive media, such as virtual reality (VR), artificial reality (AR) content or a hologram, are recently increasing. The broadcasting of an image and video having image characteristics different from those of real images, such as game images, is increasing.

Accordingly, there is a need for a high-efficiency image and video compression technology in order to effectively compress and transmit or store and playback information of high-resolution and high-quality images and video having such various characteristics.

In addition, there is a discussion on an adaptive frequency weighting quantization technique in the scaling process in order to improve compression efficiency and increase subjective/objective visual quality. In order to efficiently apply this technique, a method for signaling related information is needed.

SUMMARY

A technical aspect of the present disclosure is to provide a method and an apparatus for increasing image coding efficiency.

Another technical aspect of the present disclosure is to provide a method and apparatus for increasing coding efficiency in a scaling process.

Still another technical aspect of the present disclosure is to provide a method and apparatus for efficiently constructing a scaling list used in a scaling process.

Yet another technical aspect of the present disclosure is to provide a method and apparatus for hierarchically signaling scaling list related information used in a scaling process.

Yet another technical aspect of the present disclosure is to provide a method and apparatus for efficiently applying a scaling list-based scaling process.

According to an embodiment of this document, scaling list data may be signaled through an adaptation parameter set (APS). Furthermore, the APS may be identified based on APS ID information included in the APS. The APS may include scaling list data based on APS type information indicating the APS for the scaling list data included in the APS. Furthermore, a value of the APS ID information may have a value within a specific range with respect to the APS type information indicating the APS for the scaling list data.

According to an embodiment of this document, enabled flag information indicating whether scaling list data is used may be hierarchically signaled. Enabled flag information in a lower level syntax (e.g., a picture header/slice header/type group header) may be signaled based on enabled flag information signaled in a higher level syntax (e.g., an SPS).

According to an embodiment of this document, an SPS syntax and a PPS syntax may be constructed so that scaling list data syntax is not directly signaled in an SPS or PPS level. Accordingly, coding efficiency can be improved by individually parsing/signaling scaling list data in an APS based on enabled flag information in an SPS.

According to an embodiment of this document, there is provided a video/image decoding method performed by a decoding apparatus. The video/image decoding method may include methods disclosed in embodiments of this document.

According to an embodiment of this document, there is provided a decoding apparatus performing video/image decoding. The decoding apparatus may perform methods disclosed in embodiments of this document.

According to an embodiment of this document, there is provided a video/image encoding method performed by an encoding apparatus. The video/image encoding method may include methods disclosed in embodiments of this document.

According to an embodiment of this document, there is provided an encoding apparatus performing video/image encoding. The encoding apparatus may perform methods disclosed in embodiments of this document.

According to an embodiment of this document, there is provided a computer-readable digital storage medium in which encoded video/image information generated according to a video/image encoding method disclosed in at least one of embodiments of this document is stored.

According to an embodiment of this document, there is provided a computer-readable digital storage medium in which encoded information or encoded video/image information causing the decoding apparatus to perform a video/image decoding method disclosed in at least one of embodiments of this document is stored.

This document may have various effects. For example, according to an embodiment of this document, overall image/video compression efficiency can be improved. Furthermore, according to an embodiment of this document, coding efficiency can be enhanced and subjective/objective visual quality can be improved by applying an efficient scaling process. Furthermore, according to an embodiment of this document, a scaling list used in a scaling process can be efficiently constructed, and thus scaling list-related information can be hierarchically signaled. Furthermore, according to an embodiment of this document, coding efficiency can be increased by efficiently applying a scaling list-based scaling process. Furthermore, according to an embodiment of this document, effects in that an implementation is facilitated and the worst case memory requirement is restricted by imposing restrictions on a scaling list matrix used in a scaling process can be obtained.

Effects which may be obtained through detailed embodiments of this document are not limited to the above listed effects. For example, there may be various technical effects which may be understood or derived by a person having ordinary skill in the related art from this document. Accordingly, detailed effects of this document are not limited to those explicitly described in this document, and may include various effects which may be understood or derived from technical characteristics of this document.

DESCRIPTION OF EXEMPLARY EMBODIMENTS

Figure 1:
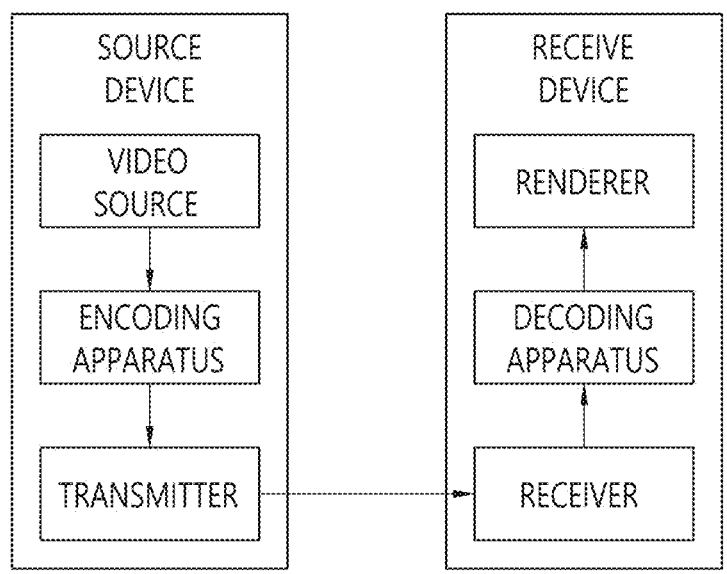
FIG. 1 schematically illustrates an example of a video/image coding system which may be applied to embodiments of this document.

This document may be modified in various ways and may have various embodiments, and specific embodiments will be illustrated in the drawings and described in detail. However, this does not intend to limit this document to the specific embodiments. Terms commonly used in this specification are used to describe a specific embodiment and is not used to limit the technical spirit of this document. An expression of the singular number includes plural expressions unless evidently expressed otherwise in the context. A term, such as "include" or "have" in this specification, should be understood to indicate the existence of a characteristic, number, step, operation, element, part, or a combination of them described in the specification and not to exclude the existence or the possibility of the addition of one or more other characteristics, numbers, steps, operations, elements, parts or a combination of them.

Meanwhile, elements in the drawings described in this document are independently illustrated for convenience of description related to different characteristic functions. This does not mean that each of the elements is implemented as separate hardware or separate software. For example, at least two of elements may be combined to form a single element, or a single element may be divided into a plurality of elements. An embodiment in which elements are combined and/or separated is also included in the scope of rights of this document unless it deviates from the essence of this document.

In this document, the term "A or B" may mean "only A", "only B", or "both A and B". In other words, in this document, the term "A or B" may be interpreted to indicate "A and/or B". For example, in this document, the term "A, B or C" may mean "only A", "only B", "only C", or "any combination of A, B and C".

A slash "/" or a comma used in this document may mean "and/or". For example, "A/B" may mean "A and/or B". Accordingly, "A/B" may mean "only A", "only B", or "both A and B". For example, "A, B, C" may mean "A, B or C".

In this document, "at least one of A and B" may mean "only A", "only B", or "both A and B". Further, in this document, the expression "at least one of A or B" or "at least one of A and/or B" may be interpreted the same as "at least one of A and B".

Further, in this document, "at least one of A, B and C" may mean "only A", "only B", "only C", or "any combination of A, B and C". Further, "at least one of A, B or C" or "at least one of A, B and/or C" may mean "at least one of A, B and C".

Further, the parentheses used in this document may mean "for example". Specifically, in the case that "prediction (intra prediction)" is expressed, it may be indicated that "intra prediction" is proposed as an example of "prediction". In other words, the term "prediction" in this document is not limited to "intra prediction", and it may be indicated that "intra prediction" is proposed as an example of "prediction". Further, even in the case that "prediction (i.e., intra prediction)" is expressed, it may be indicated that "intra prediction" is proposed as an example of "prediction".

This document relates to video/image coding. For example, the methods/embodiments disclosed in this document may be applied to a method disclosed in the versatile video coding (VVC). Further, the methods/embodiments disclosed in this document may be applied to a method disclosed in the essential video coding (EVC) standard, the AOMedia Video 1 (AV1) standard, the 2nd generation of audio video coding standard (AVS2), or the next generation video/image coding standard (e.g., H.267 or H.268, etc.).

This document presents various embodiments of video/image coding, and the embodiments may be performed in combination with each other unless otherwise mentioned.

In this document, a video may mean a set of a series of images according to the passage of time. A picture generally means a unit representing one image in a specific time period, and a slice/tile is a unit constituting a part of the picture in coding. The slice/tile may include one or more coding tree units (CTUs). One picture may consist of one or more slices/tiles. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of complete tiles or an integer number of consecutive complete CTU rows within a tile of a picture that may be exclusively contained in a single NAL unit.

Meanwhile, one picture may be divided into two or more subpictures. The subpicture may be a rectangular region of one or more slices within the picture.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component. Alternatively, a sample may mean a pixel value in the spatial domain, or may mean a transform coefficient in the frequency domain when the pixel value is transformed into the frequency domain.

A unit may represent a basic unit of image processing. The unit may include at least one of a specific region of the picture and information related to the region. One unit may include one luma block and two chroma (e.g., cb, cr) blocks. The unit may be used interchangeably with terms such as block or area in some cases. In a general case, an M×N block may include samples (or sample arrays) or a set (or array) of transform coefficients of M columns and N rows.

Also, in this document, at least one of quantization/dequantization and/or transform/inverse transform may be omitted. When the quantization/dequantization is omitted, the quantized transform coefficient may be referred to as a transform coefficient. When the transform/inverse transform is omitted, transform coefficients may be called coefficients or residual coefficients, or may still be called transform coefficients for the sake of uniformity of expression.

In this document, a quantized transform coefficient and a transform coefficient may be referred to as a transform coefficient and a scaled transform coefficient, respectively. In this case, the residual information may include information about the transform coefficient(s), and the information about the transform coefficient(s) may be signaled through a residual coding syntax. Transform coefficients may be derived based on residual information (or information about transform coefficient(s)), and scaled transform coefficients may be derived through inverse transform (scaling) on the transform coefficients. Residual samples may be derived based on an inverse transform (transform) for the scaled transform coefficients. This may be applied/expressed in other parts of this document as well.

In this document, technical features individually explained in one drawing may be individually implemented, or may be simultaneously implemented.

Hereinafter, preferred embodiments of this document are described more specifically with reference to the accompanying drawings. Hereinafter, in the drawings, the same reference numeral is used in the same element, and a redundant description of the same element may be omitted.

FIG. 1 schematically illustrates an example of a video/image coding system to which embodiments of this document may be applied.

Referring to FIG. 1, a video/image coding system may include a first device (source device) and a second device (receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Figure 2:
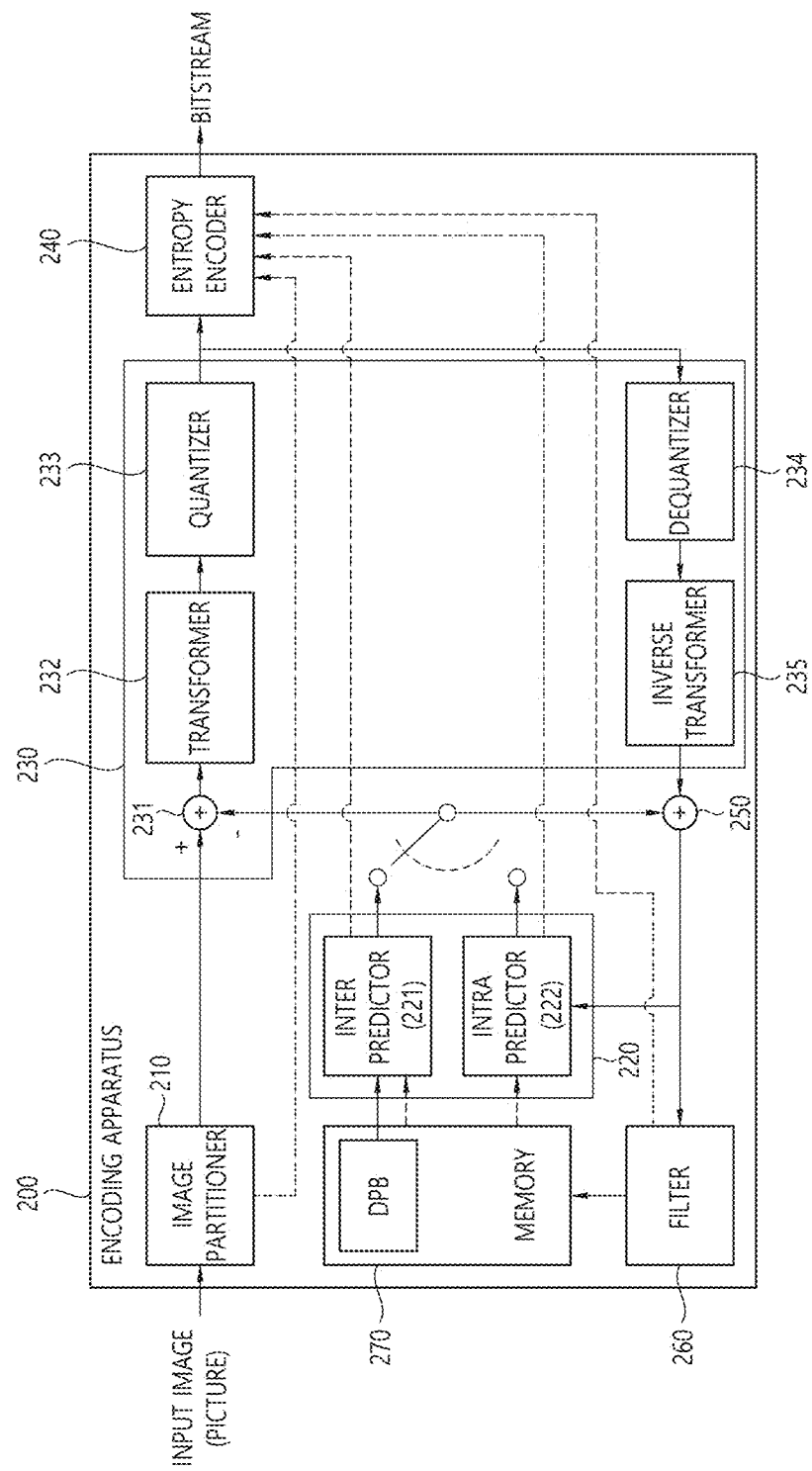
FIG. 2 is a diagram schematically describing a configuration of a video/image encoding apparatus to which embodiments of this document may be applied.

FIG. 2 is a schematic diagram illustrating a configuration of a video/image encoding apparatus to which the embodiment(s) of the present document may be applied. Hereinafter, the encoding apparatus may include an image encoding apparatus and/or a video encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (e.g., an encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to this document may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (e.g., values of syntax elements, etc.) together or separately. Encoded information (e.g., encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In this document, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus may be avoided and encoding efficiency may be improved.

The DPB of the memory 270 may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
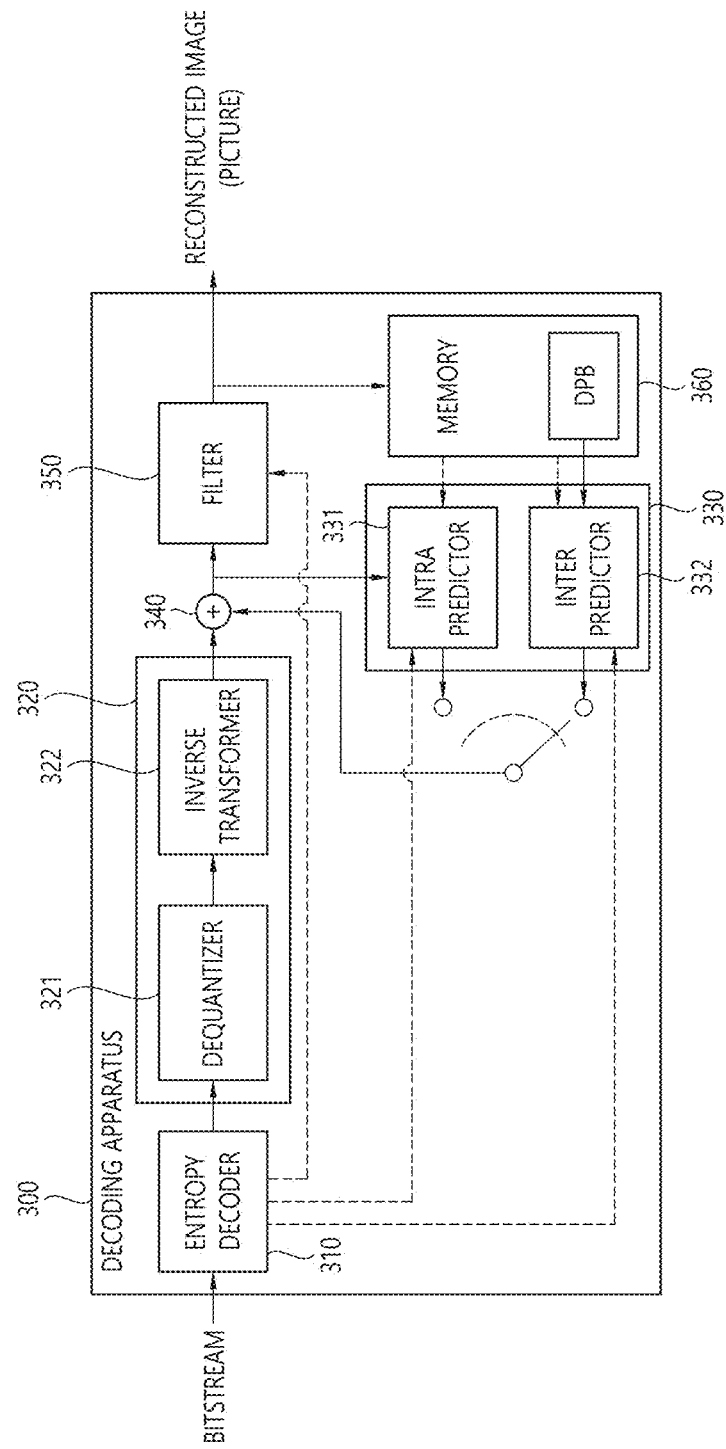
FIG. 3 is a diagram schematically describing a configuration of a video/image decoding apparatus to which embodiments of this document may be applied.

FIG. 3 is a schematic diagram illustrating a configuration of a video/image decoding apparatus to which the embodiment(s) of the present document may be applied. Hereinafter, the decoding apparatus may include an image decoding apparatus and/or a video decoding apparatus.

Referring to FIG. 3, the decoding apparatus 300 may include an entropy decoder 310, a residual processor 320, a predictor 330, an adder 340, a filter 350, a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350 may be configured by a hardware component (e.g., a decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in this document may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to this document may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (e.g., quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referenced samples may be located in the neighborhood of the current block or may be located apart according to the prediction mode. In intra prediction, prediction modes may include a plurality of non-directional modes and a plurality of directional modes. The intra predictor 331 may determine the prediction mode applied to the current block by using the prediction mode applied to the neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

As described above, in performing video coding, a prediction is performed to enhance compression efficiency. A predicted block including prediction samples for a current block, that is, a target coding block, can be generated through the prediction. In this case, the predicted block includes the prediction samples in a spatial domain (or pixel domain). The predicted block is identically derived in the encoding apparatus and the decoding apparatus. The encoding apparatus can enhance image coding efficiency by signaling, to the decoding apparatus, information on a residual (residual information) between the original block not an original sample value itself of the original block and the predicted block. The decoding apparatus may derive a residual block including residual samples based on the residual information, may generate a reconstructed including reconstructed samples by adding the residual block and the predicted block, and may generate a reconstructed picture including the reconstructed blocks.

The residual information may be generated through a transform and quantization procedure. For example, the encoding apparatus may derive the residual block between the original block and the predicted block, may derive transform coefficients by performing a transform procedure on the residual samples (residual sample array) included in the residual block, may derive quantized transform coefficients by performing a quantization procedure on the transform coefficients, and may signal related residual information to the decoding apparatus (through a bitstream). In this case, the residual information may include information, such as value information, location information, transform scheme, transform kernel, and quantization parameter of the quantized transform coefficients. The decoding apparatus may perform a dequantization/inverse transform procedure based on the residual information, and may derive residual samples (or residual block). The decoding apparatus may generate a reconstructed picture based on the predicted block and the residual block. Furthermore, the encoding apparatus may derive a residual block by dequantizing/inverse-transforming the quantized transform coefficients for reference to the inter prediction of a subsequent picture, and may generate a reconstructed picture.

The intra prediction may indicate prediction that generates prediction samples for the current block based on reference samples in a picture to which the current block belongs (hereinafter, referred to as a current picture). When the intra prediction is applied to the current block, neighboring reference samples to be used for the intra prediction of the current block may be derived. The neighboring reference samples of the current block may include a total of 2×nH samples which are samples adjacent to the left boundary and samples neighboring to the bottom-left of the current block of size nW×nH, a total of 2×nW samples which are samples adjacent to the top boundary of the current block and samples neighboring the top-right of the current block, and one sample neighboring the top-left of the current block. Alternatively, the neighboring reference samples of the current block may include top neighboring samples of a plurality of columns and left neighboring samples of a plurality of rows. In addition, the neighboring reference samples of the current block may include a total of nH samples adjacent to the right boundary of the current block of size nW×nH, a total of nW samples adjacent to the bottom boundary of the current block, and one sample neighboring the bottom-right of the current block.

However, some of the neighboring reference samples of the current block have not yet been decoded or may not be available. In this case, the decoding apparatus may construct the neighboring reference samples to be used for prediction by substituting unavailable samples with available samples.

Alternatively, the neighboring reference samples to be used for prediction may be configured through interpolation of available samples.

When the neighboring reference samples are derived, (i) a prediction sample can be derived based on the average or interpolation of the neighboring reference samples of the current block, and (ii) the prediction sample may be derived based on a reference sample existing in a specific (prediction) direction with respect to the prediction sample among neighboring reference samples of the current block. The case of (i) may be called a non-directional mode or a non-angular mode, and the case of (ii) may be called a directional mode or an angular mode.

In addition, the prediction sample may be generated through interpolation of a first neighboring sample located in the prediction direction of the intra prediction mode of the current block, based on the prediction sample of the current block, and a second neighboring sample located in a direction opposite to the prediction direction, among the neighboring reference samples. The above-described case may be referred to as linear interpolation intra prediction (LIP). In addition, chroma prediction samples may be generated based on the luma samples using a linear model. This case may be called LM mode or CCLM (chroma component LM) mode.

Further, temporary prediction samples of the current block may be derived based on the filtered neighboring reference samples, and the prediction sample of the current block may also be derived by weighted-summing at least one reference sample, which is derived according to the intra prediction mode among conventional neighboring reference samples, that is, the neighboring reference samples not filtered, and the temporary prediction sample. The aforementioned case may be called a position dependent intra prediction (PDPC).

Further, the prediction sample may be derived using the reference sample positioned in a prediction direction in a corresponding line by selecting a reference sample line with the highest prediction accuracy among the neighboring multi-reference sample lines of the current block, and an intra prediction encoding may be performed by a method for indicating (signaling) the reference sample line used at this time to the decoding apparatus. The aforementioned case may be called multi-reference line (MRL) intra prediction or intra prediction based on the MRL.

Further, the intra prediction may be performed based on the same intra prediction mode by splitting the current block into vertical or horizontal sub-partitions, and the neighboring reference samples may be derived and used in units of sub-partition. That is, in this case, the intra prediction mode for the current block is equally applied to the sub-partitions, and the neighboring reference sample may be derived and used in units of sub-partition, thereby enhancing intra prediction performance in some cases. Such a prediction method may be called intra sub-partitions (ISP) intra prediction or intra prediction based on the ISP.

The aforementioned intra prediction methods may be called an intra prediction type separately from the intra prediction mode. The intra prediction type may be called various terms such as an intra prediction technique or an additional intra prediction mode. For example, the intra prediction type (or the additional intra prediction mode or the like) may include at least one of the aforementioned LIP, PDPC, MRL, and ISP. A general intra prediction method other than specific intra prediction types such as the LIP, the PDPC, the MRL, and the ISP may be called a normal intra prediction type. The normal intra prediction type may be generally applied if the specific intra prediction type is not applied, and the prediction may be performed based on the aforementioned intra prediction mode. Meanwhile, a post-processing filtering for the derived prediction sample may also be performed if necessary.

Specifically, the intra prediction process may include an intra prediction mode/type determination step, neighboring reference samples derivation step, and a prediction sample derivation step based on the intra prediction mode/type. In addition, if necessary, a post-filtering step may be performed on the derived prediction sample.

If intra prediction is applied, an intra prediction mode applied to a current block may be determined by using an intra prediction mode of a neighboring block. For example, a decoding apparatus may select, based on a received most probable mode (MPM) index, one of MPM candidates within an MPM list derived based on an intra prediction mode of a neighboring block (e.g., a left and/or top neighboring block) of a current block and additional candidate modes, or may select, based on the remaining intra prediction mode information, one of the remaining intra prediction modes not included in MPM candidates (and a planar mode). The MPM list may be constructed to include the planar mode as a candidate or to not include the planar mode as a candidate. For example, if an MPM list includes a planar mode as a candidate, the MPM list may have six candidates. If the MPM list does not include a planar mode as a candidate, the MPM list may have five candidates. If the MPM list does not include a planar mode as a candidate, a not-planar flag (e.g., intra_luma_not_planar_flag) indicating whether an intra prediction mode of a current block is a not-planar mode may be signaled. For example, an MPM flag may be first signaled, and an MPM index and a not-planar flag may be signaled when a value of the MPM flag is 1. Furthermore, an MPM index may be signaled when a value of a not-planar flag is 1. In this case, the reason why the MPM list is constructed to not include the planar mode as a candidate is for first checking whether a mode is the planar mode by first signaling a flag (not-planar flag) because the planar mode is always considered as an MPM, rather than that the planar mode is not an MPM.

For example, whether an intra prediction mode applied to a current block is present among MPM candidates (and a planar mode) or is present among the remaining modes may be indicated based on an MPM flag (e.g., intra_luma_mpm_flag). A value 1 of an MPM flag may indicate that an intra prediction mode for a current block is present within MPM candidates (and a planar mode). A value 0 of the MPM flag may indicate that an intra prediction mode for a current block is not present within MPM candidates (and a planar mode). A value 0 of a not-planar flag (e.g., intra_luma_not_planar_flag) may indicate that an intra prediction mode for a current block is a planar mode. A value 1 of the not-planar flag value 1 may indicate that an intra prediction mode for a current block is not a planar mode. An MPM index may be signaled in the form of a mpm_idx or intra_luma_mpm_idx syntax element. The remaining intra prediction mode information may be signaled in the form of a rem_intra_luma_pred_mode or intra_luma_mpm_remainder syntax element. For example, the remaining intra prediction mode information may indicate one of the remaining intra prediction modes not included in an MPM candidates (and a planar mode) among all intra prediction modes by indexing the remaining intra prediction modes in order of a prediction mode number. An intra prediction mode may be an intra prediction mode for a luma component (sample). Hereinafter, intra prediction mode information may include at least one of an MPM flag (e.g., intra_luma_mpm_flag), a not-planar flag (e.g., intra_luma_not_planar_flag), an MPM index (e.g., mpm_idx or intra_luma_mpm_idx), or remaining intra prediction mode information (rem_intra_luma_pred_mode or intra_luma_mpm_remainder). In this document, an MPM list may be called various terms, such as an MPM candidate list and a candModeList. If matrix-based intra prediction (MIP) is applied to a current block, a separate mpm flag (e.g., intra_mip_mpm_flag), mpm index (e.g., intra_mip_mpm_idx), or remaining intra prediction mode information (e.g., intra_mip_mpm_remainder) for the MIP may be signaled, and a not-planar flag is not signaled.

In other words, in general, if a block for an image is split, a current block to be coded and a neighboring block have similar image characteristics. Accordingly, the probability that the current block and the neighboring block will have intra prediction modes that are identical with each other or similar is high. Accordingly, an encoder may use an intra prediction mode of a neighboring block in order to encode an intra prediction mode of a current block.

For example, an encoder/decoder may construct a most probable mode (MPM) for a current block. An MPM list may also be indicated as an MPM candidate list. In this case, the MPM may mean a mode used to improve coding efficiency by considering similarity between a current block and a neighboring block upon coding of an intra prediction mode. As described above, an MPM list may be constructed to include a planar mode or may be constructed by excluding a planar mode. For example, if an MPM list includes a planar mode, the number of candidates of the MPM list may be 6. Furthermore, if an MPM list does not include a planar mode, the number of candidates of the MPM list may be 5. An encoder/decoder may construct an MPM list including five or six MPMs.

In order to construct an MPM list, three types of modes of default intra modes, neighbour intra modes and derived intra modes may be taken into consideration. In this case, for the neighbour intra mode, two neighboring blocks, that is, a left neighboring block and a top neighboring block, may be taken into consideration.

If an MPM list is constructed to not include a planar mode as described above, a planar mode is excluded from the list, and the number of MPM list candidates may be set to 5.

Furthermore, a non-directional mode (or a non-angular mode) of intra prediction modes may include a DC mode based on an average of neighboring reference samples of a current block or an interpolation-based planar mode.

When inter prediction is applied, the predictor of the encoding apparatus/decoding apparatus may derive prediction samples by performing inter prediction in units of blocks. The inter prediction may be applied when performing the prediction on the current block. That is, the predictor (more specifically, inter predictor) of the encoding/decoding apparatus may derive prediction samples by performing the inter prediction in units of the block. The inter prediction may represent prediction derived by a method dependent to the data elements (e.g., sample values or motion information) of a picture(s) other than the current picture. When the inter prediction is applied to the current block, a predicted block (prediction sample array) for the current block may be derived based on a reference block (reference sample array) specified by the motion vector on the reference picture indicated by the reference picture index. In this case, in order to reduce an amount of motion information transmitted in the inter-prediction mode, the motion information of the current block may be predicted in units of a block, a subblock, or a sample based on a correlation of the motion information between the neighboring block and the current block. The motion information may include the motion vector and the reference picture index. The motion information may further include inter-prediction type (L0 prediction, L1 prediction, Bi prediction, etc.) information. In the case of applying the inter prediction, the neighboring block may include a spatial neighboring block which is present in the current picture and a temporal neighboring block which is present in the reference picture. A reference picture including the reference block and a reference picture including the temporal neighboring block may be the same as each other or different from each other. The temporal neighboring block may be referred to as a name such as a collocated reference block, a collocated CU (colCU), etc., and the reference picture including the temporal neighboring block may be referred to as a collocated picture (colPic). For example, a motion information candidate list may be configured based on the neighboring blocks of the current block and a flag or index information indicating which candidate is selected (used) may be signaled in order to derive the motion vector and/or reference picture index of the current block. The inter prediction may be performed based on various prediction modes and for example, in the case of a skip mode and a merge mode, the motion information of the current block may be the same as the motion information of the selected neighboring block. In the case of the skip mode, the residual signal may not be transmitted unlike the merge mode. In the case of a motion vector prediction (MVP) mode, the motion vector of the selected neighboring block may be used as a motion vector predictor and a motion vector difference may be signaled. In this case, the motion vector of the current block may be derived by using a sum of the motion vector predictor and the motion vector difference.

The motion information may further include L0 motion information and/or L1 motion information according to the inter-prediction type (L0 prediction, L1 prediction, Bi prediction, etc.). A L0-direction motion vector may be referred to as an L0 motion vector or MVL0 and an L1-direction motion vector may be referred to as an L1 motion vector or MVL1. A prediction based on the L0 motion vector may be referred to as an L0 prediction, a prediction based on the L1 motion vector may be referred to as an L1 prediction, and a prediction based on both the L0 motion vector and the L1 motion vector may be referred to as a bi-prediction. Here, the L0 motion vector may indicate a motion vector associated with a reference picture list L0 and the L1 motion vector may indicate a motion vector associated with a reference picture list L1. The reference picture list L0 may include pictures prior to the current picture in an output order and the reference picture list L1 may include pictures subsequent to the current picture in the output order, as the reference pictures. The prior pictures may be referred to as a forward (reference) picture and the subsequent pictures may be referred to as a reverse (reference) picture. The reference picture list L0 may further include the pictures subsequent to the current picture in the output order as the reference pictures. In this case, the prior pictures may be first indexed in the reference picture list L0 and the subsequent pictures may then be indexed. The reference picture list L1 may further include the pictures prior to the current picture in the output order as the reference pictures. In this case, the subsequent pictures may be first indexed in the reference picture list L1 and the prior pictures may then be indexed. Here, the output order may correspond to a picture order count (POC) order.

Figure 4:
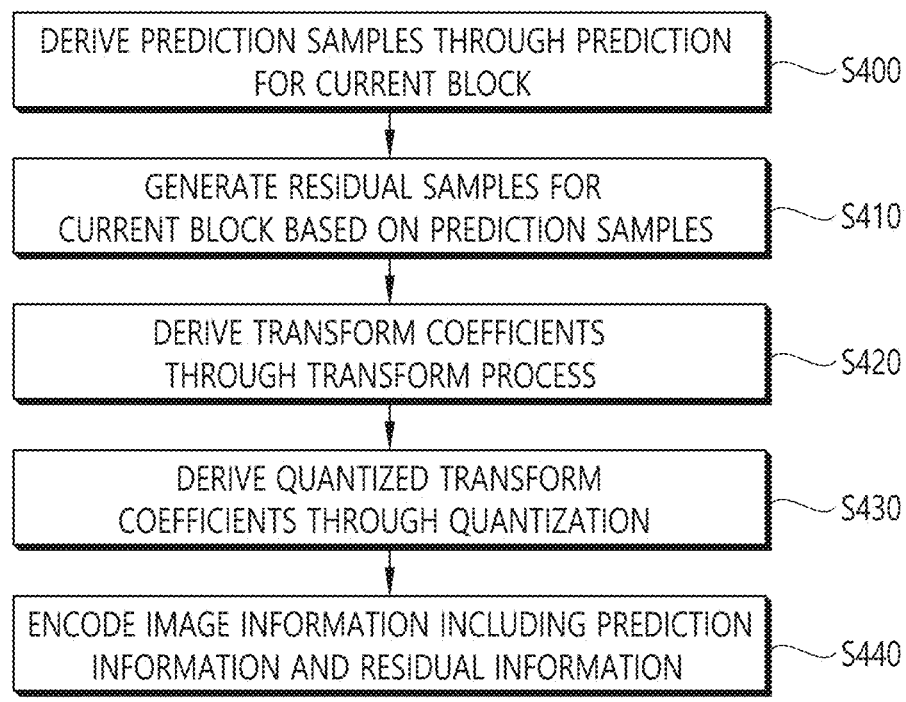
FIG. 4 illustrates an example of a schematic video/image encoding method to which an embodiment of this document may be applied.

FIG. 4 illustrates an example of a schematic video/image encoding method to which embodiments of this document are applicable.

The method disclosed in FIG. 4 may be performed by the above-described encoding apparatus 200 of FIG. 2. Specifically, S400 may be performed by the inter predictor 221 or the intra predictor 222 of the encoding apparatus 200, S410, S420, S430, S440 may be performed by the subtractor 231, the transformer 232, the quantizer 233 and the entropy encoder 240 of the encoding apparatus 200.

Referring to FIG. 4, the encoding apparatus may derive prediction samples through prediction for the current block (S400). The encoding apparatus may determine whether to perform inter prediction or intra prediction on the current block, and may determine the specific inter prediction mode or the specific intra prediction mode based on the RD cost. According to the determined mode, the encoding apparatus may derive the prediction samples for the current block.

The encoding apparatus may derive residual samples by comparing original samples and prediction samples for the current block (S410).

The encoding apparatus may derive transform coefficients through a transform process for residual samples (S420), and quantize the derived transform coefficients to derive quantized transform coefficients (S430).

The encoding apparatus may encode image information including prediction information and residual information, and output the encoded image information in the form of a bitstream (S440). The prediction information is information related to a prediction process and may include prediction mode information and motion information (e.g., when the inter prediction is applied). The residual information may include information about the quantized transform coefficients. Residual information may be entropy coded.

The output bitstream may be delivered to the decoding apparatus through a storage medium or a network.

Figure 5:
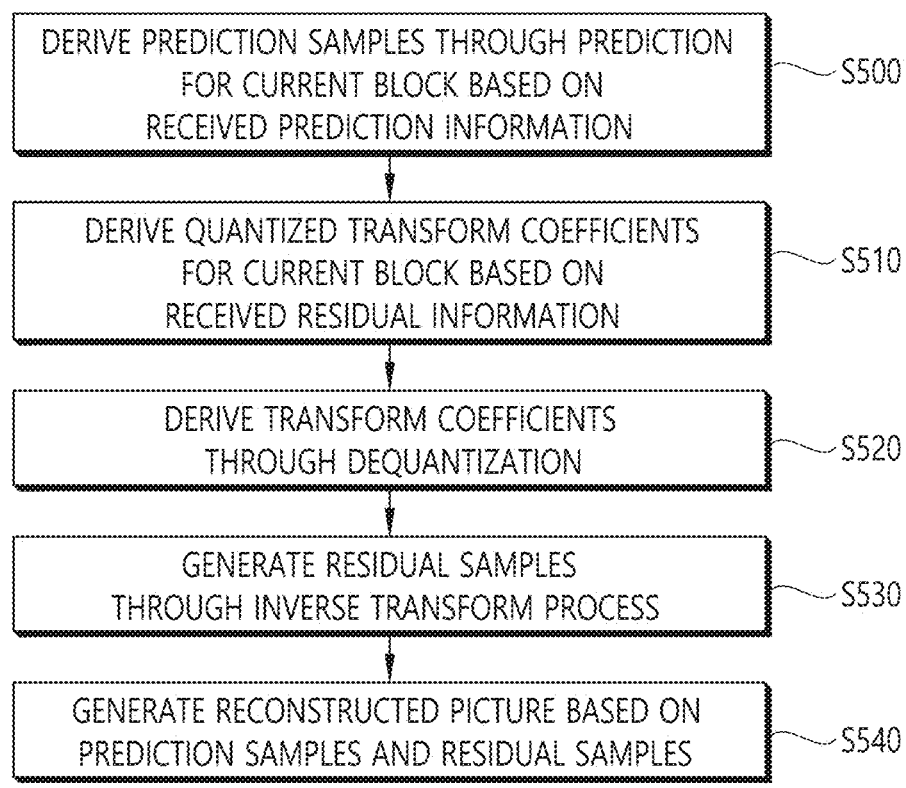
FIG. 5 illustrates an example of a schematic video/image decoding method to which an embodiment of this document may be applied.

FIG. 5 shows an example of a schematic video/image decoding method to which embodiments of the present disclosure may be applicable.

The method disclosed in FIG. 5 may be performed by the decoding apparatus 300 of FIG. 3 described above. Specifically, S500 may be performed by the inter predictor 332 or the intra predictor 331 of the decoding apparatus 300. The process of deriving values of related syntax elements by decoding the prediction information included in the bitstream in S500 may be performed by the entropy decoder 310 of the decoding apparatus 300. S510, S520, S530 and S540 may be performed by the entropy decoder 310, the dequantizer 321, the inverse transformer 322 and the adder 340 of the decoding apparatus 300, separately.

Referring to FIG. 5, the decoding apparatus may perform an operation corresponding to the operation performed by the encoding apparatus. The decoding apparatus may perform the inter prediction or the intra prediction on the current block based on the received prediction information and derive prediction samples (S500).

The decoding apparatus may derive quantized transform coefficients for the current block based on the received residual information (S510). The decoding apparatus may derive the quantized transform coefficients from residual information through entropy decoding.

The decoding apparatus may dequantize the quantized transform coefficients to derive transform coefficients (S520).

The decoding apparatus derives residual samples through an inverse transform process for the transform coefficients (S530).

The decoding apparatus may generate reconstructed samples for the current block based on the prediction samples and the residual samples, and generate a reconstructed picture based thereon. (S540). As described above, the in-loop filtering process may be further applied to the reconstructed picture thereafter.

Meanwhile, as described above, the quantizer of the encoding apparatus may apply quantization to the transform coefficients to derive quantized transform coefficients, and the dequantizer of the encoding apparatus or the dequantizer of the decoding apparatus may derive transform coefficients by applying dequantization to the quantized transform coefficients. In general, in video/image coding, a quantization rate may be changed, and compression may be adjusted using the changed quantization rate. From an implementation point of view, in consideration of complexity, a quantization parameter (QP) may be used instead of using the quantization rate directly. For example, quantization parameters of integer values from 0 to 63 may be used, and each quantization parameter value may correspond to an actual quantization rate. The quantization parameter ($QP_Y$) for the luma component (luma sample) and the quantization parameter ($QP_C$) for the chroma component (chroma sample) may be set differently.

The quantization process takes a transform coefficient (C) as an input and divides it by a quantization rate ($Q_{step}$) to obtain a quantized transform coefficient (C') based on this. In this case, in consideration of computational complexity, a quantization rate is multiplied by a scale to form an integer, and a shift operation may be performed by a value corresponding to the scale value. A quantization scale may be derived based on the product of the quantization rate and the scale value. That is, the quantization scale may be derived according to the QP. The quantization scale may be applied to the transform coefficient (C) to derive a quantized transform coefficient (C') based thereon.

The dequantization process is the inverse process of the quantization process, and a quantized transform coefficient (C') is multiplied by a quantization rate ($Q_{step}$), and a reconstructed transform coefficient (C'') can be obtained based on this. In this case, a level scale may be derived according to the quantization parameter, and the level scale may be applied to the quantized transform coefficient (C') to derive a reconstructed transform coefficient (C'') based on this. The reconstructed transform coefficient (C'') may be slightly different from the original transform coefficient (C) due to loss in the transform and/or quantization process. Accordingly, the encoding apparatus performs the dequantization in the same manner as in the decoding apparatus.

In addition, an adaptive frequency weighting quantization technique that adjusts quantization intensity according to frequency may be applied. The adaptive frequency weighting quantization technique is a method of applying different quantization strengths for each frequency. The adaptive frequency weighting quantization may differently apply a quantization intensity for each frequency using a predefined quantization scaling matrix. That is, the above-described quantization/dequantization process may be further performed based on the quantization scaling matrix. For example, different quantization scaling metrics may be used according to the size of the current block and/or whether the prediction mode applied to the current block is the inter prediction or the intra prediction in order to generate a residual signal of the current block. The quantization scaling matrix may be referred to as a quantization matrix or a scaling matrix. The quantization scaling matrix may be predefined. In addition, for adaptive frequency scaling, frequency quantization scale information with respect to the quantization scaling matrix may be configured/encoded in the encoding apparatus and signaled to the decoding apparatus. The frequency quantization scale information may be referred to as quantization scaling information. The frequency quantization scale information may include scaling list data (scaling_list_data). A (modified) quantization scaling matrix may be derived based on the scaling list data. In addition, the frequency quantization scale information may include present flag information indicating whether the scaling list data exists. Alternatively, when the scaling list data is signaled at a higher level (e.g., SPS), information indicating whether the scaling list data is modified at a lower level (e.g., PPS or tile group header etc.) may be further included.

As described above, the scaling list data may be signaled to indicate a (frequency-based quantization) scaling matrix used for quantization/dequantization.

Signaling support of default and user-defined scaling matrix exists in the HEVC standard and is currently adopted in the VVC standard. However, for the VVC standard, additional support for signaling of the following functions has been incorporated.

- Three modes for scaling matrix: OFF, DEFAULT, USER_DEFINED
- Larger size range for blocks (4×4 to 64×64 for luma, 2×2 to 32×32 for chroma)
- Rectangle Transform Blocks (TBs)
- Dependent quantization
- Multiple Transform Selection (MTS)
- Large transforms with zeroing-out high frequency coefficients
- Intra sub-block partitioning (ISP)
- Intra Block Copy (IBC) (also called current picture referencing (CPR))
- DEFAULT scaling matrix for all TB sizes, default value is 16

It should be noted that the scaling matrix should not be applied to Transform Skip (TS) and Secondary Transform (ST) for all sizes.

Hereinafter, a High Level Syntax (HSL) structure for supporting a scaling list in the VVC standard will be described in detail. First, a flag may be signaled through a Sequence Parameter Set (SPS) to indicate that a scaling list is available for a current coded video sequence (CVS) being decoded. Then, if the flag is available, an additional flag may be parsed to indicate whether specific data is present in the scaling list in the SPS. This can be shown in Table 1.

Table 1 is an excerpt from SPS to describe the scaling list for CVS.

TABLE 1

| | Descriptor |
|---|---|
| seq_parameter_set_rbsp( ) { | |
| ... | |
|   scaling_list_enabled_flag | u(1) |
|   if( scaling_list_enabled_flag ) { | |
|     sps_scaling_list_data_present_flag | u(1) |
|     if( sps_scaling_list_data_present_flag ) | |
|       scaling_list_data( ) | |
|   } | |
| ... | |
| } | |

Semantics of syntax elements included in the SPS syntax of Table 1 may be shown in Table 2 below.

TABLE 2 scaling_list_enabled_flag equal to 1 specifies that a scaling list is used for the scaling process for transform coefficients. scaling_list_enabled_flag equal to 0 specifies that scaling list is not used for the scaling process for transform coefficients.
sps_scaling_list_data_present_flag equal to 1 specifies that the scaling_list_data( ) syntax structure is present in the SPS. sps_scaling_list_data_present_flag equal to 0 specifies that the scaling_list_data( ) syntax structure is not present in the SPS. When not present, the value of sps_scaling_list_data_present_flag is inferred to be equal to 0.

Referring to Table 1 and Table 2 above, scaling_list_enabled_flag may be signaled from the SPS. For example, if the value of scaling_list_enabled_flag is 1, it may indicate that the scaling list is used in the scaling process for the transform coefficient, and if the value of scaling_list_enabled_flag is 0, it may indicate that the scaling list is not used in the scaling process for the transform coefficient. In this case, when the value of scaling_list_enabled_flag is 1, sps_scaling_list_data_present_flag may be further signaled from the SPS. For example, when the value of sps_scaling_list_data_present_flag is 1, it may indicate that scaling_list_data( ) syntax structure is present in the SPS, and when the value of sps_scaling_list_data_present_flag is 0, it may indicate that the scaling_list_data( ) syntax structure is not present in the SPS. If sps_scaling_list_data_present_flag does not exist, the value of sps_scaling_list_data_present_flag may be inferred to be 0.

Also, a flag (e.g., pps_scaling_list_data_present_flag) may be parsed first in a picture parameter set (PPS). If this flag is available, scaling_list_data( ) can be parsed in the PPS. If scaling_list_data( ) is initially present in the SPS and later parsed in the PPS, data in the PPS may take precedence over data in the SPS. Table 3 below is an excerpt from the PPS to describe the scaling list data.

TABLE 3

| | Descriptor |
|---|---|
| pic_parameter_set_rbsp( ) { | |
| ... | |
|   pps_scaling_list_data_present_flag | u(1) |
|   if( pps_scaling_list_data_present_flag ) | |
|     scaling_list_data( ) | |
|   } | |
| ... | |
| } | |

Semantics of syntax elements included in the PPS syntax of Table 3 may be shown in Table 4 below.

TABLE 4 pps_scaling_list_data_present_flag equal to 1 specifies that the scaling list data used for
the pictures referring to the PPS are derived based on the scaling lists specified by the active
SPS and the scaling lists specified by the PPS. pps_scaling_list_data_present_flag equal to
0 specifies that the scaling list data used for the pictures referring to the PPS are inferred to
be equal to those specified by the active SPS. When scaling_list_enabled_flag is equal to 0,
the value of pps_scaling_list_data_present_flag shall be equal to 0. When
scaling_list_enabled_flag is equal to 1, sps_scaling_list_data_present_flag is equal to 0 and
pps_scaling_list_data_present_flag is equal to 0, the default scaling list data are used to
derive the array ScalingFactor as described in the scaling list data semantics.

Referring to Table 3 and Table 4, pps_scaling_list_data_present_flag may be signaled from the PPS. For example, when the value of pps_scaling_list_data_present_flag is 1, it may indicate that the scaling list data used for pictures referencing the PPS is derived based on the scaling list specified by the active SPS and the scaling list specified by the PPS. When the value of pps_scaling_list_data_present_flag is 0, it may indicate that the scaling list data used for pictures referencing the PPS is inferred to be the same as the scaling list specified by the active SPS. At this time, when the value of scaling_list_enabled_flag is 0, the value of pps_scaling_list_data_present_flag should be 0. When the value of scaling_list_enabled_flag is 1, the value of sps_scaling_list_data_present_flag is 0, and the value of pps_scaling_list_data_present_flag is 0, the default scaling list data can be used to derive a scaling factor array as described in the scaling list data semantics.

The scaling list may be defined in the VVC standard for the following quantization matrix sizes. This can be shown in Table 5 below. The range of support for quantization matrices has been extended to include 2×2 and 64×64 as well as 4×4, 8×8, 16×16 and 32×32 in the HEVC standard.

TABLE 5

| Size of quantization matrix | sizeId |
|---|---|
| 1 × 1 | 0 |
| 2 × 2 | 1 |
| 4 × 4 | 2 |
| 8 × 8 | 3 |
| 16 × 16 | 4 |
| 32 × 32 | 5 |
| 64 × 64 | 6 |

Table 5 defines sizeId for all quantization matrix sizes used. matrixId can be assigned for different combinations of sizeId, a prediction mode of the coding unit (CuPredMode), and color component using the above combination. Here, CuPredMode that can be considered may be inter, intra, and IBC (Intra Block Copy). Intra mode and IBC mode may be treated the same. Thus, the same matrixId(s) can be shared for a given color component. Here, the color components that can be considered may be luma (Luma(Y)) and two color components (Cb and Cr). The allocated matrixId can be represented as shown in Table 6 below.

Table 6 shows matrixId according to sizeId, prediction mode, and color component.

TABLE 6

| sizeId | CuPredMode | cIdx (Colour component) | matrixId |
|---|---|---|---|
| 2, 3, 4, 5, 6 | MODE_INTRA | 0 (Y) | 0 |
| 1, 2, 3, 4, 5 | MODE_INTRA | 1 (Cb) | 1 |
| 1, 2, 3, 4, 5 | MODE_INTRA | 2 (Cr) | 2 |
| 2, 3, 4, 5, 6 | MODE_INTER | 0 (Y) | 3 |
| 1, 2, 3, 4, 5 | MODE_INTER | 1 (Cb) | 4 |
| 1, 2, 3, 4, 5 | MODE_INTER | 2 (Cr) | 5 |
| 2, 3, 4, 5, 6 | MODE_IBC | 0 (Y) | 0 |
| 1, 2, 3, 4, 5 | MODE_IBC | 1 (Cb) | 1 |
| 1, 2, 3, 4, 5 | MODE_IBC | 2 (Cr) | 2 |

Table 7 below shows an example of a syntax structure for scaling list data (e.g., scaling_list_data( )).

TABLE 7

| | Descriptor |
|---|---|
| scaling_list_data( ) { | |
|   for( sizeId = 1; sizeId < 7; sizeId++ ) | |
|     for( matrixId = 0; matrixId < 6; matrixId ++ ) { | |
|       if( ! ( (( sizeId == 1 ) && ( matrixId % 3 == 0 ) ) \|\| | |
| (( sizeId == 6 ) && ( matrixId % 3 != 0 ) ) ) ) { | |
|         scaling_list_pred_mode_flag[ sizeId ][ matrixId ] | u(1) |
|         if( !scaling_list_pred_mode_flag[ sizeId ][ matrixId ] ) | |
|           scaling_list_pred_matrix_id_delta[ sizeId ][ matrixId ] | ue(v) |
|         else { | |
|           nextCoef = 8 | |
|           coefNum = Min( 64, ( 1 << ( sizeId << 1 ) ) ) | |
|           if( sizeId > 3 ) { | |
|             scaling_list_dc_coef_minus8[ sizeId − 4 ][ matrixId ] | se(v) |
|             nextCoef = | |
|             scaling_list_dc_coef_minus8[ sizeId − 4 ][ matrixId ] + 8 | |
|           } | |
|           for( i = 0; i < coefNum; i++ ) { | |
|             x = DiagScanOrder[ 3 ][ 3 ][ i ][ 0 ] | |
|             y = DiagScanOrder[ 3 ][ 3 ][ i ][ 1 ] | |
|             if ( !(sizeId==6 && x>=4 && y>=4) ) { | |

TABLE 7-continued

| | Descriptor |
|---|---|
|                     scaling_list_delta_coef<br>                    nextCoef =<br>                    ( nextCoef + scaling_list_delta_coef + 256 ) % 256<br>                    ScalingList[ sizeId ][ matrixId ][ i ] = nextCoef<br>                }<br>              }<br>            }<br>          }<br>        }<br>      }<br>    }<br>} | se(v) |

The semantics of syntax elements included in the syntax of Table 7 may be shown in Table 8 below.

TABLE 8 scaling_list_pred_mode_flag[ sizeId ][ matrixId ] equal to 0 specifies that the values of the scaling list are the same as the values of a reference scaling list. The reference scaling list is specified by scaling_list_pred_matrix_id_delta[ sizeId ][ matrixId ].
scaling_list_pred_mode_flag[ sizeId ][ matrixId ] equal to 1 specifies that the values of the scaling list are explicitly signalled.
scaling_list_pred_matrix_id_delta[ sizeId ][ matrixId ] specifies the reference scaling list used to derive ScalingList[ sizeId ][ matrixId ], the derivation of
ScalingList[ sizeId ][ matrixId ] is based on
scaling_list_pred_matrix_id_delta[ sizeId ][ matrixId ] as follows:
  If scaling_list_pred_matrix_id_delta[ sizeId ][ matrixId ] is equal to 0, the scaling list is inferred from the default scaling list ScalingList[ sizeId ][ matrixId ][ i ] as specified in Tables 13-16 for i = 0 . . . Min( 63, ( 1 << ( sizeId << 1 ) ) − 1 ).
  Otherwise, the scaling list is inferred from the reference scaling list as follows:
    For sizeId =1 . . . . 6,
    refMatrixId = matrixId-
        scaling_list_pred_matrix_id_delta[ sizeId ][ matrixId ] * (sizeId == 6 ? 3 :1)
    If sizeId is equal to 1, the value of refMatrixId shall not be equal to 0 or 3. Otherwise, if sizeId is less than or equal to 5, the value of
    scaling_list_pred_matrix_id_delta[ sizeId ][ matrixId ] shall be in the range of 0 to matrixId, inclusive. Otherwise (sizeId is equal to 6), the value of
    scaling_list_pred_matrix_id_delta[ sizeId ][ matrixId ] shall be in the range of 0 to matrixId / 3, inclusive.
scaling_list_dc_coef_minus8[ sizeId ][ matrixId ] plus 8 specifies the value of the variable ScalingFactor[ 4 ][ matrixId ][ 0 ][ 0 ] for the scaling list for the 16x16 size when sizeId is equal to 4 and specifies the value of ScalingFactor[ 5 ][ matrixId ][ 0 ][ 0 ] for the scaling list for the 32x32 size when sizeId is equal to 5, and specifies the value of
ScalingFactor[ 6 ][ matrixId ][ 0 ][ 0 ] for the scaling list for the 64x64 size when sizeId is equal to 6. The value of scaling_list_dc_coef_minus8[ sizeId ][ matrixId ] shall be in the range of −7 to 247, inclusive.
    When scaling_list_pred_mode_flag[ sizeId ][ matrixId ] is equal to 0,
    scaling_list_pred_matrix_id_delta[ sizeId ][ matrixId ] is equal to 0 and sizeId is greater than 3, the value of scaling_list_dc_coef_minus8[ sizeId ][ matrixId ] is inferred to be equal to 8.
    When scaling_list_pred_matrix_id_delta[ sizeId ][ matrixId ] is not equal to 0 and sizeId is greater than 3, the value of scaling_list_dc_coef_minus8[ sizeId ][ matrixId ] is inferred to be equal to scaling_list_dc_coef_minus8[ sizeId ][ refMatrixId ].
    scaling_list_delta_coef specifies the difference between the current matrix coefficient ScalingList[ sizeId ][ matrixId ][ i ] and the previous matrix coefficient
ScalingList[ sizeId ][ matrixId ][ i − 1 ], when scaling_list_pred_
mode_flag[ sizeId ][ matrixId ] is equal to 1. The value of scaling_list_delta_coef shall be in the range of −128 to 127, inclusive. The value of ScalingList[ sizeId ][ matrixId ][ i ] shall be greater than 0. When scaling_list_pred_mode_flag[ sizeId ][ matrixId ] is equal to 1 and scaling_list_delta_coef is not present, the value of ScalingList[ sizeId ][ matrixId ][ i ] is inferred to be 0.

Referring to Table 7 and Table 8, in order to extract scaling list data (e.g., scaling_list_data( )), for all sizeId from 1 to 6 and matrixId from 0 to 5, the scaling list data can be applied to 2×2 chroma component and 64×64 luma component. Then, a flag (e.g., scaling_list_pred_mode_flag) may be parsed to indicate whether the value of the scaling list is the same as the value of the reference scaling list. The reference scaling list may be represented by scaling_list_pred_matrix_id_delta[sizeId][matrixId]. However, when scaling_list_pred_mode_flag [sizeId][matrixId] is 1, scaling list data may be explicitly signaled. When scaling_list_pred_matrix_id_delta is 0, DEFAULT mode with default value may be used as shown in Tables 9 to 12. For other values of scaling_list_pred_matrix_id_delta, as shown in the semantics of Table 8, refMatrixId may be determined first.

In explicit signaling, that is, in a USER_DEFINED mode, the maximum number of signaled coefficients may be determined first. In the case of quantization block sizes of 2×2, 4×4 and 8×8, all coefficients can be signaled. For sizes greater than 8×8, i.e., 16×16, 32×32 and 64×64, only 64 coefficients can be signaled. That is, an 8×8 base matrix may be signaled and the remaining coefficients may be upsampled from the base matrix.

Table 9 is an example showing the default value of ScalingList[1][matrixId][i] (i=0 . . . 3).

TABLE 9

| i | 0 | 1 | 2 | 3 |
|---|---|---|---|---|
| ScalingList[ 1 ][1,2,4,5][ i ] | 16 | 16 | 16 | 16 |

Table 10 is an example showing the default value of ScalingList[2][matrixId][i] (i=0 . . . 15).

TABLE 10

| i | 0 | 1 | 2 | 3 | 4 | 5 | 6 | 7 | 8 | 9 | 10 | 11 | 12 | 13 | 14 | 15 |
|---|---|---|---|---|---|---|---|---|---|---|----|----|----|----|----|----|
| ScalingList[ 2 ] [ 0 . . . 5 ][ i ] | 16 | 16 | 16 | 16 | 16 | 16 | 16 | 16 | 16 | 16 | 16 | 16 | 16 | 16 | 16 | 16 |

Table 11 below is an example showing the default value of ScalingList[3 . . . 5][matrixId][i] (i=0 . . . 63).

TABLE 11

| i | 0 | 1 | 2 | 3 | 4 | 5 | 6 | 7 | 8 | 9 | 10 | 11 | 12 | 13 | 14 | 15 |
|---|---|---|---|---|---|---|---|---|---|---|----|----|----|----|----|----|
| ScalingList[ 3 . . . 5 ][ 0 . . . 5 ][ i ] | 16 | 16 | 16 | 16 | 16 | 16 | 16 | 16 | 16 | 16 | 16 | 16 | 16 | 16 | 16 | 16 |
| i-16 | 0 | 1 | 2 | 3 | 4 | 5 | 6 | 7 | 8 | 9 | 10 | 11 | 12 | 13 | 14 | 15 |
| ScalingList[ 3 . . . 5 ][ 0 . . . 5 ][ i ] | 16 | 16 | 16 | 16 | 16 | 16 | 16 | 16 | 16 | 16 | 16 | 16 | 16 | 16 | 16 | 16 |
| i-32 | 0 | 1 | 2 | 3 | 4 | 5 | 6 | 7 | 8 | 9 | 10 | 11 | 12 | 13 | 14 | 15 |
| ScalingList[ 3 . . . 5 ][ 0 . . . 5 ][ i ] | 16 | 16 | 16 | 16 | 16 | 16 | 16 | 16 | 16 | 16 | 16 | 16 | 16 | 16 | 16 | 16 |
| i-48 | 0 | 1 | 2 | 3 | 4 | 5 | 6 | 7 | 8 | 9 | 10 | 11 | 12 | 13 | 14 | 15 |
| ScalingList[ 3 . . . 5 ][ 0 . . . 5 ][ i ] | 16 | 16 | 16 | 16 | 16 | 16 | 16 | 16 | 16 | 16 | 16 | 16 | 16 | 16 | 16 | 16 |

Table 12 is an example showing the default value of ScalingList[6][matrixId][i] (i=0 . . . 63).

TABLE 12

| i | 0 | 1 | 2 | 3 | 4 | 5 | 6 | 7 | 8 | 9 | 10 | 11 | 12 | 13 | 14 | 15 |
|---|---|---|---|---|---|---|---|---|---|---|----|----|----|----|----|----|
| ScalingList[ 6 ][ 0, 3 ][ i ] | 16 | 16 | 16 | 16 | 16 | 16 | 16 | 16 | 16 | 16 | 16 | 16 | 16 | 16 | 16 | 16 |
| i-16 | 0 | 1 | 2 | 3 | 4 | 5 | 6 | 7 | 8 | 9 | 10 | 11 | 12 | 13 | 14 | 15 |
| ScalingList[ 6 ][ 0, 3 ][ i ] | 16 | 16 | 16 | 16 | 16 | 16 | 16 | 16 | 16 | 16 | 16 | 16 | 16 | 16 | 16 | 16 |
| i-32 | 0 | 1 | 2 | 3 | 4 | 5 | 6 | 7 | 8 | 9 | 10 | 11 | 12 | 13 | 14 | 15 |
| ScalingList[ 6 ][ 0, 3 ][ i ] | 16 | 16 | 16 | 16 | 16 | 16 | 16 | 16 | 16 | 16 | 16 | 16 | 16 | 16 | 16 | 16 |
| i-48 | 0 | 1 | 2 | 3 | 4 | 5 | 6 | 7 | 8 | 9 | 10 | 11 | 12 | 13 | 14 | 15 |
| ScalingList[ 6 ][ 0, 3 ][ i ] | 16 | 16 | 16 | 16 | 16 | 16 | 16 | 16 | 16 | 16 | 16 | 16 | 16 | 16 | 16 | 16 |

As described above, the default scaling list data may be used to derive the scaling factor (ScalingFactor).

Scaling factor of 5-dimensional array ScalingFactor [sizeId][sizeId][matrixId][x][y] (where x, y=0 . . . (1<<sizeId)−1) may represent an array of scaling factors according to the variable sizeId shown in Table 5 and the variable matrixId shown in Table 6 above.

Table 13 shows examples of deriving a scaling factor according to a size of a quantization matrix based on the default scaling list described above.

TABLE 13

The elements of the quantization matrix of size 2x2, ScalingFactor[ 1 ][ matrixId ][ ][ ], are derived as follows:
  ScalingFactor[ 1 ][ 1 ][ matrixId ][ x ][ y ] = ScalingList[ 1 ][ matrixId ][ i ]
    with i = 0 . . . 3, matrixId = 1, 2, 4, 5, x = DiagScanOrder[ 1 ][ 1 ][ i ][ 0 ], and
    y = DiagScanOrder[ 1 ][ 1 ][ i ][ 1 ]
The elements of the quantization matrix of size 4x4, ScalingFactor[ 2 ][ matrixId ][ ][ ], are derived as follows:
  ScalingFactor[ 2 ][ 2 ][ matrixId ][ x ][ y ] = ScalingList[ 2 ][ matrixId ][ i ]
    with i = 0 . . . 15, matrixId = 0 . . . 5, x = DiagScanOrder[ 2 ][ 2 ][ i ][ 0 ], and
    y = DiagScanOrder[ 2 ][ 2 ][ i ][ 1 ]

TABLE 13-continued

The elements of the quantization matrix of size 8x8, ScalingFactor[ 3 ][ matrixId ][ ][ ], are
derived as follows:
   ScalingFactor[ 3 ][ 3 ][ matrixId ][ x ][ y ] = ScalingList[ 3 ][ matrixId ][ i ]
     with i = 0 . . . 63, matrixId = 0 . . . 5, x = DiagScanOrder[ 3 ][ 3 ][ i ][ 0 ], and
     y = DiagScanOrder[ 3 ][ 3 ][ i ][ 1 ]
The elements of the quantization matrix of size 16x16, ScalingFactor[ 4 ][ matrixId ][ ][ ],
are derived as follows:
   ScalingFactor[ 4 ][ 4 ][ matrixId ][x * 2 + k ][ y * 2 + j ] =
   ScalingList[ 4 ][ matrixId ][ i ] with i = 0 . . . 63, j = 0 . . . 1, k = 0 . . . 1, matrixId = 0 . .
. 5,
   x = DiagScanOrder[ 3 ][ 3 ][ i ][ 0 ], and y = DiagScanOrder[ 3 ][ 3 ][ i ][ 1 ]
   ScalingFactor[ 4 ][ 4 ][ matrixId ][ 0 ][ 0 ] =
   scaling_list_dc_coef_minus8[ 0 ][ matrixId ] + 8 with matrixId = 0 . . . 5
The elements of the quantization matrix of size 32x32, ScalingFactor[ 5 ][ matrixId ][ ][ ],
are derived as follows:
   ScalingFactor[ 5 ][ 5 ][ matrixId ][ x * 4 + k ][ y * 4 + j ] =
   ScalingList[ 5 ][ matrixId ][ i ] with i = 0 . . . 63, j = 0 . . . 3, k = 0 . . . 3, matrixId = 0 . .
. 5,
   x = DiagScanOrder[ 3 ][ 3 ][ i ][ 0 ], and y = DiagScanOrder[ 3 ][ 3 ][ i ][ 1 ]
   ScalingFactor[ 5 ][ 5 ][ matrixId ][ 0 ][ 0 ] =
   scaling_list_dc_coef_minus8[ 1 ][ matrixId ] + 8 with matrixId = 0 . . . 5
The elements of the quantization matrix of size 64x64, ScalingFactor[ 6 ][ matrixId ][ ][ ],
are derived as follows:
   ScalingFactor[ 6 ][ 6 ][ matrixId ][ x * 8 + k ][ y * 8 + j ] =
   ScalingList[ 6 ][ matrixId ][ i ] with i = 0 . . . 63, j = 0 . . . 7, k = 0 . . . 7, matrixId = 0, 3,
   x = DiagScanOrder[ 3 ][ 3 ][ i ][ 0 ], and y = DiagScanOrder[ 3 ][ 3 ][ i ][ 1 ]
   ScalingFactor[ 6 ][ 6 ][ matrixId ][ 0 ][ 0 ] =
   scaling_list_dc_coef_minus8[ 2 ][ matrixId ] + 8 with matrixId = 0, 3
   When ChromaArrayType is equal to 3, the elements of the chroma quantization matrix of
   size 64x64, ScalingFactor[ 6 ][ 6 ][ matrixId ][ ][ ], with matrixId = 1, 2, 4 and 5 are
   derived as follows:
     ScalingFactor[ 6 ][ 6 ][ matrixId ][ x * 8 + k ][ y * 8 + j ] =
     ScalingList[ 5 ][ matrixId ][ i ] with i = 0 . . . 63, j = 0 . . . 7, k = 0 . . . 7,
     x = DiagScanOrder[ 3 ][ 3 ][ i ][ 0 ], and y = DiagScanOrder[ 3 ][ 3 ][ i ][ 1 ]
     ScalingFactor[ 6 ][ 6] [ matrixId ][ 0 ][ 0 ] =
     scaling_list_dc_coef_minus8[ 1 ][ matrixId ] + 8

For a quantization matrix of rectangular size, the scaling factor of a 5-dimensional array ScalingFactor [sizeIdW][sizeIdH][matrixId][x][y], where x=0 . . . (1<<sizeIdW)−1, y=0 . . . (1<<sizeIdH)−1, sizeIdW!=sizeIdH) may represent an array of scaling factors according to the variables sizeIdW and sizeIdH shown in Table 15 below, and may be derived as shown in Table 14 below.

TABLE 14

ScalingFactor[ sizeIdW ][ sizeIdH ][ matrixId ][ x ][ y ] can be generated by
ScalingList[ sizeLId ][ matrixId ][ i ]
with sizeLId = max( sizeIdW, sizeIdH), sizeIdW = 0,1..6, sizeIdH = 0,1..6,
matrixId = 0..5, x = 0.. ( 1 << sizeIdW) − 1, y = 0.. ( 1 << sizeIdH ) − 1,
x = DiagScanOrder[ k ][ k ][ i ][ 0 ], and y = DiagScanOrder[ k ][ k ][ i ][ 1 ], k =
min(sizeLId, 3),
and ratioW = (1<<sizeIdW)/(1<<k), ratioH = (1<<sizeIdH)/(1<<k), and ratioWH =
(1<<abs(sizeIdW−sizeIdH)), as the following rules:
  - If (sizeIdW>sizeIdH)
    ScalingFactor[ sizeIdW ][ sizeIdH ][ matrixId ][ x ][ y ]
    = ScalingList[ sizeLId ][ matrixId ][ Raster2Diag[(1<<k)*((y*ratioWH)/ratioW)
    + x/ratioW]]
  - else
    ScalingFactor[ sizeIdW ][ sizeIdH ][ matrixId ][ x ][ y ]
    = ScalingList[ sizeLId ][ matrixId ][ Raster2Diag[(1<<k)*(y/ratioH) +
    (x*ratioWH)/ratioH]],
  Where Raster2Diag[ ] is the function converting raster scan position in one 8x8
  block to diagonal scan position The square-sized quantization matrix shall be zeroed for samples that satisfy the following conditions.
  x>32
  y>32
  The decoded TU is not coded with a default transform mode, (1<<sizeIdW)==32 and x>16
  The decoded TU is not coded with a default transform mode, (1<<sizeIdH)==32 and y>16
Table 15 shows an example of sizeIdW and sizeIdH according to the size of the quantization matrix.

TABLE 15

| Size of quantization matrix | sizeIdW | sizeIdH |
|---|---|---|
| 1 | 0 | 0 |
| 2 | 1 | 1 |
| 4 | 2 | 2 |
| 8 | 3 | 3 |
| 16 | 4 | 4 |

TABLE 15-continued

| Size of quantization matrix | sizeIdW | sizeIdH |
|---|---|---|
| 32 | 5 | 5 |
| 64 | 6 | 6 |

Also, as an example, the above-described scaling list data (e.g., scaling_list_data( )) may be described based on a syntax structure as shown in Table 16 and semantics as shown in Table 17 below. As described above, the scaling list, the scaling matrix, the scaling factor, etc. can be derived based on the syntax elements included in the scaling list data (e.g., scaling_list_data( )) disclosed in Table 16 and Table 17. The same or similar procedures as in Table 5 to Table 15 may be applied.

TABLE 16

|  | Descriptor |
|---|---|
| scaling_list_data( ) { |  |
|   for( id = 0; id < 28; id ++ ) { |  |
|     matrixSize = id < 2 ? 2 : ( id < 8 ? 4 : 8 ) |  |
|     if( aps_chroma_present_flag \|\| id % 3 = = 2 \|\| id = = 27 ) { |  |
|       scaling_list_copy_mode_flag[ id ] | u(1) |
|       if( !scaling_list_copy_mode_flag[ id ] ) |  |
|         scaling_list_pred_mode_flag[ id ] | u(1) |
|       if( ( scaling_list_copy_mode_flag[ id ] \|\| scaling_list_pred_mode_flag[ id ] ) && |  |
|         id != 0 && id != 2 && id != 8 ) |  |
|         scaling_list_pred_id_delta[ id ] | ue(v) |
|       if( !scaling_list_copy_mode_flag[ id ] ) { |  |
|         nextCoef = 0 |  |
|         if( id > 13 ) { |  |
|           scaling_list_dc_coef[ id − 14 ] | se(v) |
|           nextCoef += scaling_list_dc_coef[ id − 14 ] |  |
|         } |  |
|         for( i = 0; i < matrixSize * matrixSize; i++ ) { |  |
|           x = DiagScanOrder[ 3 ][ 3 ][ i ][ 0 ] |  |
|           y = DiagScanOrder[ 3 ][ 3 ][ i ][ 1 ] |  |
|           if( !( id > 25 && x >= 4 && y >= 4 ) ) { |  |
|             scaling_list_delta_coef[ id ][ i ] | se(v) |
|             nextCoef += scaling_list_delta_coef[ id ][ i ] |  |
|           } |  |
|           ScalingList[ id ][ i ] = nextCoef |  |
|         } |  |
|       } |  |
|     } |  |
|   } |  |
| } |  |

TABLE 17 scaling_list_copy_mode_flag[ id ] equal to 1 specifies that the values of the scaling list are the same as the values of a reference scaling list. The reference scaling list is specified by scaling_list_pred_id_delta[ id ].
scaling_list_copy_mode_flag[ id ] equal to 0 specifies that scaling_list_pred_mode_flag is present. When not present, the value of scaling_list_copy_mode_flag[ id ] is inferred to be equal to 1.
scaling_list_pred_mode_flag[ id ] equal to 1 specifies that the values of the scaling list can be predicted from a reference scaling list. The reference scaling list is specified by scaling_list_pred_id_delta[ id ].
scaling_list_pred_mode_flag[ id ] equal to 0 specifies that the values of the scaling list are explicitly signalled. When not present, the value of scaling_list_pred_mode_flag[id] is inferred to be equal to 0.
scaling_list_pred_id_delta[ id ] specifies the reference scaling list used to derive the predicted scaling matrix ScalingMatrixPred[ id ]. When not present, the value of scaling_list_pred_id_delta[ id ] is inferred to be equal to 0. The value of scaling_list_pred_id_delta[ id ] shall be in the range of 0 to maxIdDelta with maxIdDelta derived depending on id as follows:

$$\text{maxIdDelta} = ( \text{id} < 2 ) \ ?\ \text{id} : ( ( \text{id} < 8 )\ ?\ ( \text{id} - 2 ) : ( \text{id} - 8 ) ) \quad (106)$$

The variables refId and matrixSize are derived as follows:

$$\text{refId} = \text{id} - \text{scaling\_list\_pred\_id\_delta}[\ \text{id}\ ] \quad (107)$$

$$\text{matrixSize} = ( \text{id} < 2 )\ ?\ 2 : ( ( \text{id} < 8 )\ ?\ 4 : 8 ) \quad (108)$$

The (matrixSize)×(matrixSize) array ScalingMatrixPred[ x ][ y ] with x = 0..matrixSize − 1, y = 0..matrixSize − 1 and the variable ScalingMatrixDCPred are derived as follows:
- When both scaling_list_copy_mode_flag[ id ] and scaling_list_pred_mode_flag[ id ] are equal to 0, all elements of ScalingMatrixPred are set equal to 8, and the value of ScalingMatrixDCPred is set equal to 8.
- Otherwise, when scaling_list_pred_id_delta[ id ] is equal to 0, all elements of ScalingMatrixPred are set equal to 16, and ScalingMatrixDCPred is set equal to 16.

TABLE 17-continued

- Otherwise (either scaling_list_copy_mode_flag[ id ] or scaling_list_pred_mode_flag[ id ] is equal to 1 and scaling_list_pred_id_delta[ id ] is greater than 0), ScalingMatrixPred is set equal to ScalingMatrixRec[ refId ], and the following applies for ScalingMatrixDCPred:
  - If refId is greater than 13, ScalingMatrixDCPred is set equal to ScalingMatrixDCRec[ refId − 14 ].
  - Otherwise (refId is less than or equal to 13), ScalingMatrixDCPred is set equal to ScalingMatrixPred[ 0 ][ 0 ].

scaling_list_dc_coef[ id − 14 ] is used to derive the value of the variable ScalingMatrixDC[ id − 14 ] when id is greater than 13 as follows:

ScalingMatrixDCRec[ id − 14 ] = ( ScalingMatrixDCPred + scaling_list_dc_coef[ id − 14 ] ) & 255    (109)

When not present, the value of scaling_list_dc_coef[ id − 14 ] is inferred to be equal to 0. The value of scaling_list_dc_coef[ id − 14 ] shall be in the range of −128 to 127, inclusive. The value of ScalingMatrixDCRec[ id − 14 ] shall be greater than 0.

scaling_list_delta_coef[ id ][ i ] specifies the difference between the current matrix coefficient ScalingList[ id ][ i ] and the previous matrix coefficient ScalingList[ id ][ i − 1 ], when scaling_list_copy_mode_flag[ id ] is equal to 0. The value of scaling_list_delta_coef[ id ][ i ] shall be in the range of −128 to 127, inclusive. When scaling_list_copy_mode_flag[ id ] is equal to 1, all elements of ScalingList[ id ] are set equal to 0.

The (matrixSize)×(matrixSize) array ScalingMatrixRec[ id ] is derived as follows:

ScalingMatrixRec[ id ][ x ][ y ] = ( ScalingMatrixPred[ x ][ y ] + ScalingList[ id ][ k ] ) & 255    (110)

with k = 0..( matrixSize * matrixSize − 1 ),
  x = DiagScanOrder[ Log2( matrixSize ) ][ Log2( matrixSize ) ][ k ][ 0 ], and
  y = DiagScanOrder[ Log2( matrixSize ) ][ Log2( matrixSize ) ][ k ][ 1 ]

The value of ScalingMatrixRec[ id ][ x ][ x ] shall be greater than 0.

Hereinafter, this document proposes a method for efficiently signaling scaling list data in applying an adaptive frequency weighting quantization technique in a quantization/dequantization process.

Figure 6:
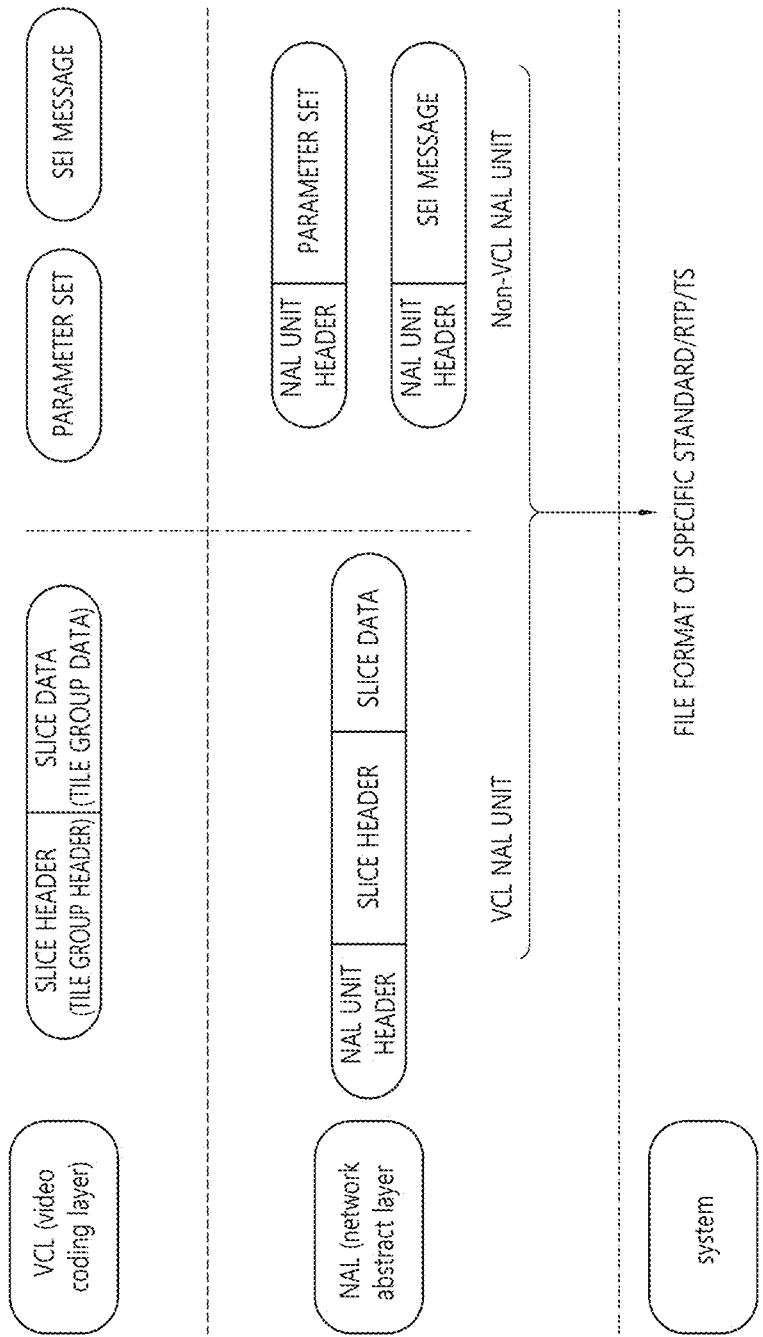
FIG. 6 exemplarily illustrates a hierarchical structure for a coded image/video.

FIG. 6 exemplarily shows a hierarchical structure for a coded image/video.

Referring to FIG. 6, the coded image/video is divided into VCL (video coding layer) that deals with an image/video decoding process and itself, a subsystem that transmits and stores the coded information, and a network abstraction layer (NAL) that exists between the VCL and subsystems and is responsible for network adaptation functions.

The VCL may generate VCL data including compressed image data (slice data), or generate parameter sets including a picture parameter set (Picture Parameter Set: PPS), a sequence parameter set (Sequence Parameter Set: SPS), a video parameter set (Video Parameter Set: VPS) etc. or a supplemental enhancement information (SEI) message additionally necessary for the decoding process of an image.

In the NAL, a NAL unit may be generated by adding header information (NAL unit header) to a raw byte sequence payload (RBSP) generated in the VCL. In this case, the RBSP refers to slice data, parameter sets, SEI messages, etc. generated in the VCL. The NAL unit header may include NAL unit type information specified according to RBSP data included in the corresponding NAL unit.

Further, the NAL unit may be divided into a VCL NAL unit and a Non-VCL NAL unit according to the RBSP generated in the VCL. The VCL NAL unit may mean a NAL unit including information (sliced data) about an image, and the Non-VCL NAL unit may mean a NAL unit containing information (parameter set or SEI message) necessary for decoding an image.

The above-described VCL NAL unit and Non-VCL NAL unit may be transmitted through a network by attaching header information according to a data standard of the subsystem. For example, the NAL unit may be transformed into a data form of a predetermined standard such as H.266/VVC file format, Real-time Transport Protocol (RTP), Transport Stream (TS), etc. and transmitted through various networks.

As described above, in the NAL unit, the NAL unit type may be specified according to the RBSP data structure included in the corresponding NAL unit, and information on this NAL unit type may be stored and signaled in the NAL unit header.

For example, the NAL unit may be roughly classified into the VCL NAL unit type and the Non-VCL NAL unit type depending on whether the NAL unit includes information about the image (slice data). The VCL NAL unit type may be classified according to property and a type of a picture included in the VCL NAL unit, and the Non-VCL NAL unit type may be classified according to the type of a parameter set.

The following is an example of the NAL unit type specified according to the type of parameter set included in the Non-VCL NAL unit type.

APS (Adaptation Parameter Set) NAL unit: Type for NAL unit including APS

DPS (Decoding Parameter Set) NAL unit: Type for NAL unit including DPS

VPS (Video Parameter Set) NAL unit: Type for NAL unit including VPS

SPS (Sequence Parameter Set) NAL unit: Type for NAL unit including SPS

PPS (Picture Parameter Set) NAL unit: Type for NAL unit including PPS

PH (Picture header) NAL unit: Type for NAL unit including PH

The above-described NAL unit types have syntax information for the NAL unit type, and the syntax information may be stored and signaled in a NAL unit header. For example, the syntax information may be nal_unit_type, and NAL unit types may be specified by a nal_unit_type value.

Meanwhile, as described above, one picture may include a plurality of slices, and one slice may include a slice header and slice data. In this case, one picture header may be further added to a plurality of slices (a slice header and a slice data set) in one picture. The picture header (picture header syntax) may include information/parameters commonly applicable to the picture. In this document, a slice may be mixed or replaced with a tile group. Also, in this document, a slice header may be mixed or replaced with a type group header.

The slice header (slice header syntax) may include information/parameters commonly applicable to the slice. The APS (APS syntax) or PPS (PPS syntax) may include information/parameters commonly applicable to one or more slices or pictures. The SPS (SPS syntax) may include information/parameters commonly applicable to one or more sequences. The VPS (VPS syntax) may include information/parameters commonly applicable to multiple layers. The DPS (DPS syntax) may include information/parameters commonly applicable to the entire video. The DPS may include information/parameters related to concatenation of a coded video sequence (CVS). In this document, high level syntax (HLS) may include at least one of the APS syntax, PPS syntax, SPS syntax, VPS syntax, DPS syntax, picture header syntax, and slice header syntax.

In this document, the image/video information encoded in the encoding apparatus and signaled in the form of a bitstream to the decoding apparatus may include, as well as picture partitioning-related information in the picture, intra/inter prediction information, residual information, in-loop filtering information, etc. the information included in the slice header, the information included in the picture header, the information included in the APS, the information included in the PPS, the information included in the SPS, the information included in the VPS, and/or the information included in the DPS. In addition, the image/video information may further include information of the NAL unit header.

On the other hand, APS (Adaptation Parameter Set) is used in the VVC standard to transmit information for ALF (Adaptive Loop Filter) and LMCS (Luma Mapping with Chroma Scaling) process. In addition, the APS has an extensible structure so that it can be used to transmit other data structures (i.e., different syntax structures). Accordingly, this document proposes a method of parsing/signaling scaling list data used for frequency weighting quantization through the APS.

The scaling list data is quantization scale information for the frequency weighting quantization that can be applied in the quantization/dequantization process as described above, and may be a list that associates a scale factor with each frequency index.

As an embodiment, the following Table 18 shows an example of an adaptation parameter set (APS) structure used to transmit scaling list data.

TABLE 18

| | Descriptor |
|---|---|
| adaptation_parameter_set_rbsp( ) { | |
|   adaptation_parameter_set_id | u(5) |
|   aps_params_type | u(3) |
|   if( aps_params_type == ALF_APS ) // 0 | |
|     alf_data( ) | |
|   else if ( aps_params_type == LMCS_APS ) // 1 | |
|     lmcs_data( ) | |
|   else if ( aps_params_type == SCALING_APS ) // 2 | |
|     scaling_list_data( ) | |
|   aps_extension_flag | u(1) |
|   if( aps_extension_flag ) | |
|     while( more_rbsp_data( ) ) | |
|       aps_extension_data_flag | u(1) |
|   rbsp_trailing_bits( ) | |
| } | |

Semantics of syntax elements included in the APS syntax of Table 18 may be shown in Table 19 below.

TABLE 19 adaptation_parameter_set_id provides an identifier
for the APS for reference by other syntax elements.
NOTE - APSs can be shared across pictures
and can be different in different tile groups
within a picture.

TABLE 19-continued aps_extension_flag equal to 0 specifies that no
aps_extension_data_flag syntax elements
are present in the APS RBSP syntax structure.
aps_extension_flag equal to 1 specifies that
there are aps_extension_data_flag syntax
elements present in the APS RBSP syntax
structure.
aps_extension_data_flag may have any value.
Its presence and value do not affect decoder
conformance to profiles specified in this version
of this Specification. Decoders conforming
to this version of this Specification shall ignore
all aps_extension_data_flag syntax elements.
aps_params_type specifies the type of APS
parameters carried in the APS as specified in
the Table 19 shown below.

Referring to Table 18 and Table 19, adaptation_parameter_set_id syntax element may be parsed/signaled in the APS. adaptation_parameter_set_id provides an identifier for the APS for reference of other syntax elements. That is, the APS may be identified based on the adaptation_parameter_set_id syntax element. The adaptation_parameter_set_id syntax element may be called APS ID information. The APS may be shared between pictures and may be different in different tile groups within a picture.

In addition, aps_params_type syntax element may be parsed/signaled in the APS. aps_params_type may indicate the type of the APS parameter transmitted from the APS as shown in Table 20 below. The aps_params_type syntax element may be referred to as APS parameter type information or APS type information.

For example, the following Table 20 is an example showing the types of APS parameters that can be transmitted through the APS, and each APS parameter type may be indicated in correspondence with a value of aps_params_type.

TABLE 20

| aps_params_type | Name of aps_params_type | Type of APS parameters |
|---|---|---|
| 0 | ALF_APS | ALF parameters |
| 1 | LMCS_APS | LMCS parameters |
| 2 | SCALING_APS | SCALING list data parameters |
| 3 . . . 7 | Reserved | Reserved |

Referring to Table 20, aps_params_type may be a syntax element for classifying the type of the corresponding APS. When the value of aps_params_type is 0, the corresponding APS type may be ALF_APS, the corresponding APS may carry ALF data, and the ALF data may include ALF parameters for deriving filter/filter coefficients. When the value of aps_params_type is 1, the corresponding APS type may be LMCS_APS, the corresponding APS may carry LMCS data, and the LMCS data may include LMCS parameters for deriving an LMCS model/bins/mapping index. When the value of aps_params_type is 2, the corresponding APS type may be SCALING_APS, the corresponding APS may carry SCALING list data, and the SCALING list data may include scaling list data parameters for deriving a value of a frequency-based quantization scaling matrix/scaling factor/scaling list.

For example, as shown in Table 18 above, the aps_params_type syntax element may be parsed/signaled in APS, and in this case, when aps_params_type indicates a value of 0 (i.e., aps_params_type indicates ALF_APS) ALF data (i.e., alf_data( )) can be parsed/signaled. Alternatively, when aps_params_type has a value of 1 (i.e., aps_params_type indicates LMCS_APS), LMCS data (ie, lmcs_data( )) may be parsed/signaled. Alternatively, when aps_params_type has a value of 2 (i.e., aps_params_type indicates SCALING_APS), scaling list data (i.e., scaling_list_data( )) may be parsed/signaled.

In addition, referring to Tables 18 and 19, aps_extension_flag syntax element may be parsed/signaled in the APS. aps_extension_flag may indicate whether APS extension data flag (aps_extension_data_flag) syntax elements are present. aps_extension_flag may be used, for example, to provide extension points for a later version of the VVC standard. The aps_extension_flag syntax element may be called an APS extension flag. For example, when the value of aps_extension_flag is 0, it may indicate that the APS extension data flag (aps_extension_data_flag) does not exist in an APS RBSP syntax structure. Alternatively, when the value of aps_extension_flag is 1, it may indicate that the APS extension data flag (aps_extension_data_flag) is present in the APS RBSP syntax structure.

The aps_extension_data_flag syntax element may be parsed/signaled based on the aps_extension_flag syntax element. The aps_extension_data_flag syntax element may be called an APS extension data flag. For example, when the value of aps_extension_flag is 1, aps_extension_data_flag may be parsed/signaled, and in this case, aps_extension_data_flag may have an arbitrary value.

As described above, according to an embodiment of this document, efficient scaling list data can be carried by allocating a data type (e.g., SCALING_APS) for indicating the scaling list data and parsing/signaling a syntax element (e.g., aps_params_type) indicating the data type. That is, according to an embodiment of this document, the structure of the APS in which the scaling list data is integrated may be used.

On the other hand, in the current VVC standard, the use of the scaling list data (i.e., scaling_list_data( )) may be indicated based on whether a flag (i.e., sps_scaling_list_enabled_flag) indicating whether or not the scaling list data is available in SPS (Sequence Parameter Set) exists. If the flag (i.e., sps_scaling_list_enabled_flag) is enabled (i.e., 1 or true as a case indicating that scaling list data is available), another flag (i.e., sps_scaling_list_data_present_flag) may be parsed. Also, when sps_scaling_list_data_present_flag is enabled (i.e., when it indicates that scaling list data exists in the SPS, and is 1 or true), the scaling list data (i.e., scaling_list_data( )) may be parsed. That is, in the current VVC standard, the SPS signals the scaling list data. In this case, since the SPS enables session negotiation and is generally transmitted out of band, it may be unnecessary to transmit the scaling list data as information which is related to the determination of the scaling factor of the transform block and can be used during the decoding process. If the encoder transmits the scaling list data in the SPS, the decoder needs to reserve a significant amount of memory to store the information obtained from the scaling list data and also needs to retain the information until it is used in transform block decoding. Therefore, this process may be unnecessary at the SPS level, and it may be more effective to be parsed/signaled at the lower level. Accordingly, this document proposes a hierarchical structure to effectively parse/signal the scaling list data.

In one embodiment, the scaling list data is not parsed/signaled from the higher-level syntax SPS, but parsed/signaled from the lower-level syntax PPS, tile group header, slice header, and/or other appropriate headers.

For example, the SPS syntax may be modified as shown in Table 21 below. Table 21 below shows an example of SPS syntax for describing a scaling list for CVS.

TABLE 21

| | Descriptor |
|---|---|
| seq_parameter_set_rbsp( ) { | |
| ... | |
| scaling_list_enabled_flag | u(1) |
| ... | |
| } | |

The semantics of the syntax elements included in the SPS syntax of Table 21 may be shown in Table 22 below.

TABLE 22 scaling_list_enabled_flag equal to 1 specifies that
a scaling list is used for the scaling
process for transform coefficients. scaling_list_enabled_flag
equal to 0 specifies that scaling
list is not used for the scaling process for transform coefficients.

Referring to Tables 21 and 22, scaling_list_enabled_flag syntax element may be parsed/signaled in the SPS. The scaling_list_enabled_flag syntax element may indicate whether the scaling list is available based on whether the value is 0 or 1. For example, when the value of scaling_list_enabled_flag is 1, it indicates that the scaling list is used in the scaling process for the transform coefficient, and when the value of scaling_list_enabled_flag is 0, it may indicate that the scaling list is not used in the scaling process for the transform coefficient.

That is, the scaling_list_enabled_flag syntax element may be called a scaling list available flag, and may be signaled at SPS (or SPS level). In other words, based on the value of scaling_list_enabled_flag signaled at the SPS level, it may be determined that the scaling list is basically available for pictures in the CVS referring to the corresponding SPS. In addition, the scaling list may be obtained by signaling an additional available flag at a lower level than the SPS (e.g., PPS, tile group header, slice header, and/or other appropriate header).

Furthermore, sps_scaling_list_data_present_flag syntax element may not be parsed/signaled in an SPS. That is, flag information may not be parsed/signaled by removing the sps_scaling_list_data_present_flag syntax element from the SPS. The sps_scaling_list_data_present_flag syntax element may be information indicating whether a syntax structure of scaling list data is present in the SPS. The scaling list data designated by the SPS may be parsed/signaled based on the flag information. However, the scaling list data may not be parsed/signaled in an SPS level by removing the sps_scaling_list_data_present_flag syntax element.

As described above, according to an embodiment of this document, the scaling list (scaling_list_data( )) is not directly signaled at the SPS level, and only the scaling list available flag (scaling_list_enabled_flag) may be configured to be explicitly signaled. Thereafter, the scaling list (scaling_list_data( )) may be individually parsed in the lower-level syntax based on the available flag (scaling_list_enabled_flag) in the SPS. Therefore, according to an embodiment of this document, since the scaling list data can be parsed/signaled according to a hierarchical structure, coding efficiency can be further improved.

On the other hand, the existence or non-existence of the scaling list data and the use of the scaling list data are conditional on the existence of a tool enabling flag. Here, the tool enabling flag may be information indicating whether to enable the corresponding tool, and may include, for example, scaling_list_enabled_flag syntax element. That is, the scaling_list_enabled_flag syntax element may be used to indicate whether to enable the scaling list by indicating whether the scaling list data is available. However, this tool should have syntactic constraints on the decoder. That is, there must be a constraint flag to inform the decoder that this tool is not currently being used for decoding coded video sequences (CVS). Accordingly, this document proposes a method in which a constraint flag for scaling list data is applied.

As an embodiment, the following Table 23 shows an example of a syntax (e.g., general constraint information syntax) for signaling scaling list data using a constraint flag.

TABLE 23

| | Descriptor |
|---|---|
| general_constraint_info( ) { | |
| ... | |
| no_scaling_list_constraint_flag | u(1) |
| .... | |
| } | |

Semantics of syntax elements included in the syntax of Table 23 may be shown in Table 24 below.

TABLE 24

| no_scaling_list_constraint_flag equal to 1 specifies that it is a requirement of bitstream conformacne that scaling_list_enabled_flag shall be equal to 0. no_scaling_list_constraint_flag equal to 0 does not impose a constraint. |
|---| constraint_flag syntax element is 0, it may indicate that there is no restriction.

Meanwhile, as described above, according to the embodiment of this document, the scaling list data may be delivered through a hierarchical structure. Accordingly, this document proposes a structure of scaling list data that can be parsed/signaled through a slice header. Here, the slice header may be referred to as a tile group header, or may be mixed or replaced with a picture header.

As an embodiment, the following Table 25 shows an example of a slice header syntax for signaling scaling list data.

TABLE 25

| | Descriptor |
|---|---|
| slice header( ) { | |
|   slice_pic_parameter_set_id | ue(v) |
| ... | |
|   if( scaling_list_enabled_flag ) { | |
|     slice_scaling_list_enabled_flag | u(1) |
|     if( slice_scaling_list_enabled_flag ) | |
|       slice_scaling_list_aps_id | u(5) |
|   } | |
| ... | |
|   byte_alignment( ) | |
| } | |

The semantics of syntax elements included in the slice header syntax of Table 25 may be expressed as Table 26 below.

TABLE 26

| When present, the value of each of the slice header syntax elements slice_pic_parameter_set_id, slice_pic_order_cnt_lsb, and slice_temporal_mvp_enabled_flag shall be the same in all slice headers of a coded picture. slice_pic_parameter_set_id specifies the value of pps_pic_parameter_set_id for the PPS in use. The value of slice_pic_parameter_set_id shall be in the range of 0 to 63, inclusive. slice_scaling_list_enabled_flag equal to 1 specifies that scaling list is enabled for the current slice. slice_scaling_list_enabled_flag equal to 0 specifies that scaling list is not enabled for the current slice. When slice_scaling_list_enabled_flag is not present, it is inferred to be equal to 0. slice_scaling_list_aps_id specifies the adaptation_parameter_set_id of the SCALING DATA APS that the slice refers to. The TemporalId of the SCALING DATA APS NAL unit having adaptation_parameter_set_id equal to slice_scaling_list_aps_id shall be less than or equal to the TemporalId of the coded slice NAL unit. When multiple SCALING DATA APSs with the same value of adaptation_parameter_set_id are referred to by two or more slices of the same picture, the multiple SCALING DATA APSs with the same value of adaptation_parameter_set_id shall have the same content. |
|---|

Referring to Tables 23 and 24, the constraint flag may be parsed/signaled through general_constraint_info( ). general_constraint_info( ) may be referred to as information about a general constraint information field or constraint flags. For example, no_scaling_list_constraint_flag syntax element may be used as the constraint flag. Here, the constraint flag may be used to designate conformance bitstream properties. For example, when the value of the no_scaling_list_constraint_flag syntax element is 1, scaling_list_enabled_flag indicates a bitstream conformance requirement that must be specified as 0, and when the value of the no_scaling_list_

Referring to Tables 25 and 26, slice_pic_parameter_set_id syntax element may be parsed/signaled in the slice header. The slice_pic_parameter_set_id syntax element may indicate an identifier for a PPS in use. That is, the slice_pic_parameter_set_id syntax element is information for identifying a PPS referenced in a corresponding slice, and may indicate a value of pps_pic_parameter_set_id. The value of slice_pic_parameter_set_id must be in the range of 0 to 63. The slice_pic_parameter_set_id syntax element may be referred to as PPS identification information or PPS ID information referenced by a slice.

In addition, the slice_scaling_list_enabled_flag syntax element may be parsed/signaled in the slice header. The slice_scaling_list_enabled_flag syntax element may indicate whether a scaling list is available in the current slice. For example, when the value of slice_scaling_list_enabled_flag is 1, it may indicate that the scaling list is available in the current slice, and when the value of slice_scaling_list_enabled_flag is 0, it may indicate that the scaling list is not available in the current slice. Alternatively, if slice_scaling_list_enabled_flag does not exist in the slice header, its value may be inferred to be 0.

In this case, whether to parse the slice_scaling_list_enabled_flag syntax element may be determined based on the scaling_list_enabled_flag syntax element signaled in the higher-level syntax (i.e., SPS). For example, when the value of scaling_list_enabled_flag signaled from SPS is 1 (that is, when it is determined that scaling list data is available at a higher level), slice_scaling_list_enabled_flag is parsed from the slice header, and whether to perform a scaling process may be determined using a scaling list in a corresponding slice.

In addition, the slice_scaling_list_aps_id syntax element may be parsed/signaled in the slice header. The slice_scaling_list_aps_id syntax element may indicate an identifier for an APS referenced in a corresponding slice. That is, the slice_scaling_list_aps_id syntax element may indicate ID information of the APS (adaptation_parameter_set_id) including the scaling list data referenced by the corresponding slice. On the other hand, the TemporalId (i.e., Temporal ID) of the APS NAL unit (i.e., the APS NAL unit including the scaling list data) having the same APS ID information (adaptation_parameter_set_id) as slice_scaling_list_aps_id must be less than or equal to TemporalId (i.e., Temporal ID) of the slice NAL unit to be coded.

In addition, whether to parse the slice_scaling_list_aps_id syntax element may be determined based on the slice_scaling_list_enabled_flag syntax element. For example, when the value of slice_scaling_list_aps_id is 1 (i.e., when the scaling list is determined to be available in the slice header), slice_scaling_list_aps_id may be parsed. Thereafter, the scaling list data may be obtained from the APS indicated by the parsed slice_scaling_list_aps_id.

In addition, when a plurality of SCALING DATA APSs (a plurality of APSs including scaling list data) having the APS ID information (adaptation_parameter_set_id) of the same value are referenced by two or more slices in the same picture, the plurality of SCALING DATA APSs having the APS ID information of the same value (adaptation_parameter_set_id) must include the same content.

In addition, when the above-mentioned syntax elements are present, the values of each of the slice header syntax elements slice_pic_parameter_set_id, slice_pic_order_cnt_lsb, and slice_temporal_mvp_enabled_flag must be the same in all slice headers in the coded picture.

As described above, according to an embodiment of this document, a hierarchical structure may be used to efficiently signal the scaling list data. That is, it is possible to determine whether to use the scaling list data at each lower level by first signaling an enable flag (e.g., scaling_list_enabled_flag) indicating whether or not scaling list data is available at a higher level (SPS syntax), and then signaling an additional available flag (e.g., slice_scaling_list_enabled_flag) at a lower level (e.g., slice header, picture header, etc.). In addition, APS ID information (e.g., slice_scaling_list_aps_id) referred to by the corresponding slice or tile group is signaled through the lower level (e.g., slice header, picture header, etc.), and the scaling list data may be derived from the APS identified by the APS ID information.

In addition, this document may be applied such as the methods proposed in Tables 25 and 26 above in signaling the scaling list data according to the hierarchical structure, and the scaling list data may be delivered through the structure of the slice header as shown in Table 27 below.

As an embodiment, the following Table 27 shows an example of a slice header syntax for signaling the scaling list data. Here, the slice header may be referred to as a tile group header, or may be mixed or replaced with a picture header.

TABLE 27

| | Descriptor |
|---|---|
| slice_header( ) { | |
|   slice_pic_parameter_set_id | ue(v) |
|   ... | |
|   if( scaling_list_enabled_flag ) { | |
|     slice_scaling_list_aps_id | u(5) |
|   } | |
|   ... | |
|   byte_alignment( ) | |
| } | |

The semantics of syntax elements included in the slice header syntax of Table 27 may be shown in Table 28 below.

TABLE 28

When present, the value of each of the slice header syntax elements slice_pic_parameter_set_id, slice_pic_order_cnt_lsb, and slice_temporal_mvp_enabled_flag shall be the same in all slice headers of a coded picture.
slice_pic_parameter_set_id specifies the value of pps_pic_parameter_set_id for the PPS in use. The value of slice_pic_parameter_set_id shall be in the range of 0 to 63, inclusive.
slice_scaling_list_aps_id specifies the adaptation parameter_set_id of the SCALING DATA APS that the slice refers to. The TemporalId of the SCALING LIST APS NAL unit having adaptation_parameter_set_id equal to slice_scaling_list_aps_id shall be less than or equal to the TemporalId of the coded slice NAL unit.
When multiple SCALING LIST APSs with the same value of adaptation_parameter_set_id are referred to by two or more slices of the same picture, the multiple SCALING LIST APSs with the same value of adaptation_parameter_set_id shall have the same content.

Referring to Tables 27 and 28 above, the slice_pic_parameter_set_id syntax element may be parsed/signaled in the slice header. The slice_pic_parameter_set_id syntax element may indicate an identifier for a PPS in use. That is, the slice_pic_parameter_set_id syntax element is information for identifying a PPS referenced in a corresponding slice, and may indicate a value of pps_pic_parameter_set_id. The value of slice_pic_parameter_set_id must be in the range of 0 to 63. The slice_pic_parameter_set_id syntax element may be referred to as PPS identification information or PPS ID information referenced by a slice.

In addition, the slice_scaling_list_aps_id syntax element may be parsed/signaled in the slice header. The slice_scaling_list_aps_id syntax element may indicate an identifier for an APS referenced in a corresponding slice. That is, the slice_scaling_list_aps_id syntax element may indicate ID information (adaptation_parameter_set_id) of the APS including the scaling list data referenced by the corresponding slice. For example, the TemporalId (i.e., Temporal ID) of the APS NAL unit (i.e., the APS NAL unit including the scaling list data) having the same APS ID information (adaptation_parameter_set_id) as the slice_scaling_list_aps_id must be less than or equal to TemporalId (i.e., Temporal ID) of the slice NAL unit to be coded.

In this case, whether to parse the slice_scaling_list_aps_id syntax element may be determined based on the scaling_list_enabled_flag syntax element signaled in the higher-level syntax (i.e., SPS). For example, when the value of scaling_list_enabled_flag signaled by SPS is 1 (that is, when it is determined that scaling list data is available at a higher level), slice_scaling_list_aps_id may be parsed from the slice header. Thereafter, the scaling list data can be obtained from the APS indicated by the parsed slice_scaling_list_aps_id.

That is, according to the present embodiment, since the APS ID including the scaling list data can be parsed when the corresponding flag (e.g., scaling_list_enabled_flag) in the SPS is enabled, as shown in Table 25 above, based on the scaling_list_enabled_flag syntax element signaled in the higher level syntax (i.e., SPS), the APS ID (e.g.: slice_scaling_list_aps_id) information including the scaling list data to be referenced in the lower level (e.g., slice header or picture header) can be parsed.

In addition, this document proposes a method of using a plurality of APSs to signal the scaling list data. Hereinafter, a method of efficiently signaling a plurality of APS IDs including the scaling list data according to an embodiment of the present document will be described. This method can be useful during bitstream merging.

As an embodiment, the following Table 29 shows an example of a slice header syntax for signaling scaling list data using a plurality of APSs. Here, the slice header may be referred to as a tile group header, or may be mixed or replaced with a picture header.

TABLE 29

| | Descriptor |
|---|---|
| slice_header( ) { | |
|   slice_pic_parameter_set_id | ue(v) |
|   if(scaling_list_enabled_flag) { | |
|     slice_scaling_list_enabled_flag | u(1) |
|     if( slice_scaling_list_enabled_flag ) { | |
|       num_scaling_list_aps_ids_minus1 | ue(v) |
|       for( i = 0; i <= num_scaling_list_aps_ids_minus1; i++ ) | |
|         slice_scaling_list_aps_id[ i ] | u(5) |
|     } | |
|   } | |
| ... | |
|   byte_alignment( ) | |
| } | |

The semantics of syntax elements included in the slice header syntax of Table 29 can be expressed as shown in Table 30 below.

TABLE 30

| |
|---|
| slice_scaling_list_enabled_flag equal to 1 specifies that scaling list is enabled for the current slice. slice_scaling_list_enabled_flag equal to 0 specifies that scaling list is not enabled for the current slice. When |

TABLE 30-continued

| |
|---|
| slice_scaling_list_enabled_flag is not present, it is inferred to be equal to 0. num_scaling_list_aps_ids_minus1 plus 1 specifies the number of SCALING LIST APSS that the slice refers to. The value of num_scaling_list_aps_ids_minus1 shall be in the range of 0 to 7, inclusive slice_scaling_list_aps_id[ i ] specifies the adaptation_parameter_set_id of the i-th SCALING LIST APS that the slice refers to. The TemporalId of the SCALING LIST APS NAL unit having adaptation_parameter_set_id equal to slice_scaling_list_aps_id[ i ] shall be less than or equal to the TemporalId of the coded slice NAL unit. When multiple SCALING LIST APSs with the same value of adaptation_parameter_set_id are referred to by two or more slices of the same picture, the multiple SCALING LIST APSS with the same value of adaptation_parameter_set_id shall have the same content. |

Referring to Tables 29 and 30 above, slice_pic_parameter_set_id syntax element may be parsed/signaled in the slice header. The slice_pic_parameter_set_id syntax element may indicate an identifier for the PPS being used in the slice_pic_parameter_set_id syntax element. That is, the slice_pic_parameter_set_id syntax element is information for identifying a PPS referenced in a corresponding slice, and may indicate a value of pps_pic_parameter_set_id. The value of slice_pic_parameter_set_id must be in the range of 0 to 63. The slice_pic_parameter_set_id syntax element may be referred to as PPS identification information or PPS ID information referenced by a slice.

In addition, the slice_scaling_list_enabled_flag syntax element may be parsed/signaled in the slice header. The slice_scaling_list_enabled_flag syntax element may indicate whether a scaling list is available in the current slice. For example, when the value of slice_scaling_list_enabled_flag is 1, it may indicate that the scaling list is available in the current slice, and when the value of slice_scaling_list_enabled_flag is 0, it may indicate that the scaling list is not available in the current slice. Alternatively, when slice_scaling_list_enabled_flag does not exist in the slice header, its value may be inferred to be 0.

In this case, whether to parse the slice_scaling_list_enabled_flag syntax element may be determined based on the scaling_list_enabled_flag syntax element signaled in the higher-level syntax (i.e., SPS). For example, when the value of scaling_list_enabled_flag signaled from SPS is 1 (that is, when it is determined that scaling list data is available at a higher level), slice_scaling_list_enabled_flag is parsed from the slice header, and whether to perform a scaling process may be determined using a scaling list in a corresponding slice.

In addition, the num_scaling_list_aps_ids_minus1 syntax element may be parsed/signaled in the slice header. The num_scaling_list_aps_ids_minus1 syntax element may be information for indicating the number of APSs including scaling list data referenced by a corresponding slice. For example, a value obtained by adding 1 to the value of the num_scaling_list_aps_ids_minus1 syntax element may be the number of APSs. The value of num_scaling_list_aps_ids_minus1 must be in the range of 0 to 7.

Here, whether to parse the num_scaling_list_aps_ids_minus1 syntax element may be determined based on the slice_scaling_list_enabled_flag syntax element. For example, when the value of slice_scaling_list_enabled_flag is 1 (i.e., when it is determined that scaling list data is available in the corresponding slice), num_scaling_list_aps_ids_minus1 may be parsed. In this case, the slice_s- caling_list_aps_id[i] syntax element may be parsed/signaled based on the value of num_scaling_list_aps_ids_minus1.

That is, slice_scaling_list_aps_id[i] may indicate an identifier (adaptation_parameter_set_id) of an APS including i-th scaling list data (i.e., i-th SCALING LIST APS). In other words, the APS ID information may be signaled as many as the number of APSs indicated by the num_scaling_list_aps_ids_minus1 syntax element. On the other hand, the TemporalId (i.e., Temporal ID) of the APS NAL unit (i.e., the APS NAL unit including the scaling list data) having the same APS ID information (adaptation_parameter_set_id) as slice_scaling_list_aps_id[i] must be less than or equal to TemporalId (i.e., Temporal ID) of the slice NAL unit to be coded.

In addition, when a plurality of SCALING DATA APSs (a plurality of APSs including scaling list data) having the APS ID information (adaptation_parameter_set_id) of the same value are referenced by two or more slices in the same picture, the plurality of SCALING DATA APSs having the APS ID information of the same value (adaptation_parameter_set_id) must include the same content.

Further, the present disclosure proposes a scheme for the scaling list data not to be redundantly signaled in signaling the scaling list data in accordance with the hierarchical structure. As an embodiment, the signaling of the scaling list data may be removed from the picture parameter set (PPS). The scaling list data may be fully signaled by the SPS or APS and/or another appropriate header set.

As an embodiment, the following Table 31 shows an example of the PPS syntax that does not signal the scaling list data in the PPS.

TABLE 31

| | Descriptor |
|---|---|
| pic_parameter_set_rbsp( ) { | |
|   pps_pic_parameter_set_id | ue(v) |
|   ... | ue(v) |
| } | |

Table 32 below is an example illustrating semantics for a syntax element (e.g., pps_scaling_list_data_present_flag) which may be removed in order to avoid redundant signaling of scaling list data in the PPS syntax of Table 31.

TABLE 32

| |
|---|
| pps_scaling_list_data_present_flag equal to 1 specifies that the scaling list data used for the pictures referring to the PPS are derived based on the scaling lists specified by the active SPS and the scaling lists specified by the PPS. pps_scaling_list_data_present_flag equal to 0 specifies that the scaling list data used for the pictures referring to the PPS are inferred to be equal to those specified by the active SPS. When scaling_list_enabled_flag is equal to 0, the value of pps_scaling_list_data_present_flag shall be equal to 0. When scaling_list_enabled_flag is equal to 1, sps_scaling_list_data_present_flag is equal to 0 and pps_scaling_list_data_present_flag is equal to 0, the default scaling list data are used to derive the array ScalingFactor as described in the scaling list data semantics as specified in clause 7.4.7.12. |

Referring to Table 31 and Table 32 above, information for signaling the scaling list data in PPS, for example, the pps_scaling_list_data_present_flag syntax element, may be removed from the PPS. The pps_scaling_list_data_present_flag syntax element may represent whether the scaling list data is signaled by the PPS based on whether the value thereof is 0 or 1. For example, if the value of the pps_scaling_list_data_present_flag syntax element is equal to 1, it may be represented that the scaling list data used for pictures referring to the PPS is derived based on the scaling list specified by the active SPS and the scaling list data specified by the PPS. If the value of the pps_scaling_list_data_present_flag syntax element is equal to 0, it may be represented that the scaling list data used for the pictures referring to the PPS are inferred to be equal to that specified by the active SPS. That is, the pps_scaling_list_data_present_flag syntax element may be information for representing whether the scaling list data being signaled from the PPS is present.

That is, in the present embodiment, in order to prevent the scaling list data from being redundantly signaled, the scaling list data can be made not to be parsed/signaled by the PPS by removing the pps_scaling_list_data_present_flag syntax element (i.e., by not signaling the pps_scaling_list_data_present_flag syntax element) as in Table 31 above.

Further, the present disclosure proposes a scheme for signaling a scaling list matrix in an APS. The existing scheme uses three kinds of modes (i.e., OFF, DEFAULT, and USER_DEFINED mode). The OFF mode represents that the scaling list data is not applied to a transform block. The DEFAULT mode represents that a fixed value is used in generating the scaling matrix. The USER_DEFINED mode represents that the scaling matrix is used based on a block size, a prediction mode, and a color component. The total number of scaling matrixes being currently supported in the VVC is 44, and thus is greatly increased as compared with the total number of scaling matrixes of 28 in HEVC. Currently, the scaling list data may be signaled by the SPS, and may conditionally exist in the PPS. Since the scaling list data is signaled by the APS, redundant signaling of the same data by the SPS and the PPS is unnecessary, and thus may be removed.

For example, the scaling matrix defined in the current VVC represents whether the flag is enabled in the SPS by using the scaling_list_enabled_flag. If it is represented that the flag is enabled, the scaling list is used in the scaling process for the transform coefficients, whereas if it is represented that the flag is not enabled, the scaling list is not used (e.g., OFF mode) in the scaling process for the transform coefficients. Further, the sps_scaling_list_data_present_flag related to representing whether the scaling list data is present in the SPS may be parsed. In addition to the signaling in the SPS, the scaling list data may also be present in the PPS. If the pps_scaling_list_data_present_flag represents that the flag is enabled in the PPS, the scaling list data may be present in the PPS. If the scaling list data is present in both the SPS and the PPS, the scaling list data from the PPS may be used in frames referring to the active PPS. In case that the scaling_list_enable_flag represents that the flag is enabled, but the scaling list data is present only in the SPS, and is not present in the PPS, the scaling list data from the SPS may be referred to by the frames. In case that the scaling_list_enable_flag represents that the flag is enabled, and the scaling list data is not present in the SPS or the PPS, the DEFAULT mode may be used. Further, the use of the DEFAULT mode may be signaled within the scaling list data itself. If the scaling list data is explicitly signaled, the USER DEFINED mode may be used. A scaling factor for a given transform block may be determined using information being signaled from the scaling list. For this, it is proposed to signal the scaling list data in the APS.

Currently, the scaling list data is adopted and used in the VVC, and the scaling matrix supported in the VVC is more extensive than that in the HEVC. The scaling matrix supported in the VVC may select a block size from 4×4 to 64×64 for luma, and from 2×2 to 32×32 for chroma. Further, a rectangular transform block (TB) size, dependent quantization, multiple transform selection, large transform with zeroing out high frequency coefficients, intra subblock partitioning (ISP), and intra block copy (IBC) may be integrated. The intra block copy (IBC) and the intra coding mode may share the same scaling matrix.

Accordingly, in case of the USER_DEFINED mode, the number of matrixes being signaled may be as follow.

MatrixType: 30=2 (2 for intra & IBC/inter)×3 (Y/Cb/Cr components)×5 (square TB size: from 4×4 to 64×64 for luma, from 2×2 to 32×32 for chroma)

MatrixType_DC: 14=2 (2 for intra & IBC/inter×1 for Y component)×3 (TB size: 16×16, 32×32, 64×64)+4 (2 for intra & IBC/inter×2 for Cb/Cr components)×2 (TB size: 16×16, 32×32)

The DC value may be separately coded with respect to scaling matrixes having sizes of 16×16, 32×32, and 64×64. If the transform block (TB) size is smaller than 8×8, signaling may be performed for all elements in one scaling matrix. If the transform block (TB) size is equal to or larger than 8×8, signaling may be performed only with respect to 64 elements in one 8×8 scaling matrix as a default scaling matrix. In order to obtain a square matrix having a size larger than 8×8, the default 8×8 matrix may be up-sampled corresponding to a necessary size. In case that the DEFAULT mode is used, the number of scaling matrixes may be set to 16. Accordingly, 44 different matrixes are supported in the VVC, whereas only 28 matrixes are supported in the HEVC. The number of scaling matrixes supported in the VVC is more extensive than that in the HEVC, and in order to avoid redundant signaling in the SPS and/or PPS, the APS may be used as more practical selection for signaling the scaling list data. This can avoid unnecessary redundant signaling of the scaling list data.

To solve the above-described problem, the present disclosure proposes a scheme for signaling the scaling matrix in the APS. For this, the scaling list data may be signaled only by the APS without being signaled by the SPS or conditional existence in the PPS. Further, the APS ID may be signaled by the slice header.

As an embodiment, the SPS may signal a flag (e.g., scaling_list_enable_flag) related to representing whether the scaling list data is used, the PPS may not signal a flag (e.g., pps_scaling_list_data_present_flag) related to representing whether the scaling list data is present by removing the flag, and the APS may signal the scaling list data. Further, the slice header may signal the APS ID. In this case, if the value of the scaling_list_enable_flag signaled in the SPS is equal to 1 (i.e., if it is represented that the scaling list data is used), and the APS ID is not signaled in the slice header, the DEFAULT scaling matrix may be used. An embodiment of the present disclosure as described above may be implemented by the syntax and the semantics as in Tables 33 to 41.

Table 33 represents an example of an APS structure used for signaling the scaling list data.

TABLE 33

|  | Descriptor |
|---|---|
| adaptation_parameter_set_rbsp( ) { |  |
|   adaptation_parameter_set_id | u(5) |
|   aps_params_type | u(3) |
|   if( aps_params_type == ALF_APS ) |  |
|     alf_data(adaptation_parameter_set_id ) |  |
|   else if ( aps_params_type == LMCS_APS ) |  |
|     lmcs_data( ) |  |
|   else if ( aps_params_type == SCALING_APS ) // 2 |  |
|     scaling_list_data( ) |  |
|   aps_extension_flag | u(1) |
|   if( aps_extension_flag ) |  |
|     while( more_rbsp_data( ) ) |  |
|       aps_extension_data_flag | u(1) |
|   rbsp_trailing_bits( ) |  |
| } |  |

The semantics of syntax elements included in the APS syntax of Table 33 above may be expressed as shown in Table 34 below.

TABLE 34 adaptation_parameter_set_id provides an identifier for the APS for reference by other syntax elements.
  NOTE - APSs can be shared across pictures and can be different in different slices within a picture.
aps_extension_flag equal to 0 specifies that no aps_extension_data_flag syntax elements are present in the APS RBSP syntax structure. aps_extension_flag equal to 1 specifies that there are aps_extension_data_flag syntax elements present in the APS RBSP syntax structure.
aps_extension_data_flag may have any value. Its presence and value do not affect decoder conformance to profiles specified in this version of this Specification. Decoders conforming to this version of this Specification shall ignore all aps_extension_data_flag syntax elements.
aps_params_type specifies the type of APS parameters carried in the APS as specified in the Table 35 shown below.

Referring to Table 33 and Table 34 above, the adaptation_parameter_set_id syntax element may be parsed/signaled in the APS. The adaptation_parameter_set_id provides an identifier for the APS for referring to other syntax elements. That is, the APS may be identified based on the adaptation_parameter_set_id syntax element. The adaptation_parameter_set_id syntax element may be called APS ID information. The APS may be shared between pictures, and may differ from each other in another slice in the picture.

Further, the aps_params_type syntax element may be parsed/signaled in the APS. As shown in the following Table 35, the aps_params_type may represent the type of an APS parameter transmitted from the APS. The aps_params_type syntax element may be called APS parameter type information or APS type information.

For example, the following Table 35 shows an example representing the types of APS parameters that can be transmitted through an APS, and each APS parameter type may be represented corresponding to an aps_params_type value.

TABLE 35

| aps_params_type | Name of aps_params_type | Type of APS parameters |
|---|---|---|
| 0 | ALF_APS | ALF parameters |
| 1 | LMCS_APS | LMCS parameters |
| 2 | SCALING_APS | SCALING list data parameters |
| 3 ... 7 | Reserved | Reserved |

Referring to Table 35 above, the aps_params_type may be a syntax element for classifying the type of the corresponding APS. If a value of the aps_params_type is equal to 0, the corresponding APS type may be ALF_APS, the corresponding APS may carry ALF data, and ALF data may include ALF parameters for deriving filters/filter coefficients. If the value of the aps_params_type is equal to 1, the corresponding APS type may be LMCS_APS, the corresponding APS may carry LMCS data, and the LMCS data may include LMCS parameters for deriving LMCS models/bins/mapping indexes. If the value of the aps_params_type is equal to 2, the corresponding APS type may be SCALING_APS, the corresponding APS may carry SCALING list data, and the SCALING list data may include scaling list data parameters for deriving the value of frequency-based quantization scaling matrix/scaling factor/scaling list.

For example, as shown in Table 33 above, the aps_params_type syntax element may be parsed/signaled in the APS, and in this case, if the value of the aps_params_type is equal to 0 (i.e., if the aps_params_type represents the ALF_APS), the ALF data (i.e., alf_data( )) may be parsed/signaled. Further, if the value of the aps_params_type is equal to 1 (i.e., if the aps_params_type represents the LMCS_APS), the LMCS data (i.e., lmcs_data( )) may be parsed/signaled. Further, if the value of the aps_params_type is equal to 2 (i.e., if the aps_params_type represents the SCALING_APS), the scaling list data (i.e., scaling_list_data( )) may be parsed/signaled.

Further, referring to Table 33 and Table 34 above, the aps_extension_flag syntax element may be parsed/signaled in the APS. The aps_extension_flag may indicate whether APS extension data flag (aps_extension_data_flag) syntax element is present. For example, the aps_extension_flag may be used to provide extension points for a later version of the VVC standard. The aps_extension_flag syntax element may be called an APS extension flag. For example, if a value of the aps_extension_flag is equal to 0, it may represent that the APS extension data flag (aps_extension_data_flag) is not present in the APS RBSP syntax structure. Further, if the value of the aps_extension_flag is equal to 1, it may represent that the APS extension data flag (aps_extension_data_flag) is present in the APS RBSP syntax structure.

Based on the aps_extension_flag syntax element, the aps_extension_data_flag syntax element may be parsed/signaled. The aps_extension_data_flag syntax element may be called the APS extension data flag. For example, if a value of the aps_extension_flag is equal to 1, the aps_extension_data_flag may be parsed/signaled, and in this case, the aps_extension_data_flag may have a random value.

As described above, according to an embodiment of the present disclosure, the scaling list data can be efficiently carried by allocating the data type (e.g., SCALING_APS) for representing the scaling list data, and by parsing/signaling the syntax element (e.g., aps_params_type) for representing the data type. That is, according to an embodiment of the present disclosure, the APS structure in which the scaling list data are integrated may be used.

Further, in signaling the scaling list data in the APS, the SPS may signal whether the scaling list data is used, and based on this, the scaling list data may be parse/signaled according to the APS parameter type (e.g., aps_params_type) in the APS. Further, in an embodiment of the present disclosure, in order to avoid signaling of the redundant scaling list data in the upper level syntax, flag information related to representing whether the scaling list data syntax structure (e.g., scaling_list_data( )) is present in the SPS or PPS may be made not to be parsed/signaled from the SPS or PPS, and thus the scaling list data may not be signaled in the SPS or PPS. This may be implemented by the syntax and the semantics as in the following Table 36 to Table 39.

For example, the SPS syntax may be corrected as in the following Table 36. Table 36 represents an example of the SPS syntax structure in which the SPS does not signal the scaling list data.

TABLE 36

| | Descriptor |
|---|---|
| seq_parameter_set_rbsp( ) { | |
| ... | |
| scaling_list_enabled_flag | u(1) |
| ... | |
| } | |

The semantics of the syntax elements included in the SPS syntax of Table 36 may be modified like Table 37 below. For example, in Table 36 and Table 37, in order to avoid redundant signaling of scaling list data, some (e.g., sps_scaling_list_data_present_flag) of syntax elements included in an SPS may be removed.

TABLE 37 scaling_list_enabled_flag equal to 1 specifies that a scaling list is used for the scaling process for transform coefficients. scaling_list_enabled_flag equal to 0 specifies that scaling list is not used for the scaling process for transform coefficients.
sps_scaling_list_data_present_flag equal to 1 specifies that the scaling_list_data( ) syntax structure is present in the SPS. sps_scaling_list_data_present_flag equal to 0 specifies that the scaling_list_data( ) syntax structure is not present in the SPS. When not present, the value of sps_scaling_list_data_present_flag is inferred to be equal to 0.

Referring to Table 36 and Table 37 above, the scaling_list_enabled_flag syntax element may be parsed/signaled in the SPS. The scaling_list_enabled_flag syntax element may represent whether the scaling list is used based on whether the syntax element value is 0 or 1. For example, if a value of the scaling_list_enabled_flag is equal to 1, it may be represented that the scaling list is used in the scaling process for the transform coefficient, and if the value of the scaling_list_enabled_flag is equal to 0, it may represent that the scaling list is not used in the scaling process for the transform coefficient.

That is, the scaling_list_enabled_flag syntax element may be called a scaling list enabled flag, and may be signaled in the SPS (or SPS level). In other words, based on the value of the scaling_list_enabled_flag signaled at the SPS level, the scaling list may be determined to be basically used with respect to the pictures in the CVS referring to the corresponding SPS. Further, the scaling list may be obtained by signaling an additional enabled flag at a lower level (e.g., PPS, tile group header, slice header, and/or another appropriate header) than the SPS.

Further, the sps_scaling_list_data_present_flag syntax element may not be parsed/signaled in the SPS. That is, by removing the sps_scaling_list_data_present_flag syntax element in the SPS, this flag information may be made not to be parsed/signaled. The sps_scaling_list_data_present_flag syntax element is flag information related to representing whether the syntax structure of the scaling list data is present in the SPS, and in accordance with this flag information, the scaling list data specified by the SPS may be parsed/signaled. However, through removal of the sps_scaling_list_data_present_flag syntax element, the SPS level may be configured not to directly signal the scaling list data, but to explicitly signal the scaling list enabled flag (scaling_list_enabled_flag) only.

Further, signaling of the scaling list data in the PPS may be removed as in the following Table 38. For example, the following Table 38 represents an example of the PPS syntax structure in which the PPS does not signal the scaling list data.

TABLE 38

| | Descriptor |
|---|---|
| pic_parameter_set_rbsp( ) { | |
|   pps_pic_parameter_set_id | ue(v) |
|   ... | ue(v) |
| } | |

The semantics of the syntax elements included in the PPS syntax of Table 38 may be modified like Table 39 below. For example, Table 39 below illustrates semantics for a syntax element (e.g., pps_scaling_list_data_present_flag) which may be removed in order to avoid redundant signaling of scaling list data in a PPS syntax.

TABLE 39 pps_scaling_list_data_present_flag equal to 1 specifies that the scaling list data used for the pictures referring to the PPS are derived based on the scaling lists specified by the active SPS and the scaling lists specified by the PPS. pps_scaling_list_data_present_flag equal to 0 specifies that the scaling list data used for the pictures referring to the PPS are inferred to be equal to those specified by the active SPS. When scaling_list_enabled_flag is equal to 0, the value of pps_scaling_list_data_present_flag shall be equal to 0. When scaling_list_enabled_flag is equal to 1, sps_scaling_list_data_present_flag is equal to 0 and pps_scaling_list_data_present_flag is equal to 0, the default scaling list data are used to derive the array ScalingFactor as described in the scaling list data semantics as specified in clause 7.4.7.12.

Referring to Table 38 and Table 39 above, the pps_scaling_list_data_present_flag syntax element may not be parsed/signaled in the PPS. That is, by removing the pps_scaling_list_data_present_flag syntax element in the PPS, this flag information may be configured not to be parsed/signaled. The pps_scaling_list_data_present_flag syntax element may be flag information for representing whether the syntax structure of the scaling list data is present in the PPS, and in accordance with this flag information, the scaling list data specified by the PPS may be parsed/signaled. However, through removal of the pps_scaling_list_data_present_flag syntax element, the scaling list data may not be directly signaled at the PPS level.

As described above, by removing the flag information for representing whether the scaling list data is present at the SPS or PPS level, the SPS syntax and the PPS syntax may be configured so that the scaling list data syntax is not directly signaled at the SPS or PPS level. The SPS may explicitly signal the scaling list enabled flag (scaling_list_enabled_flag) only, and thereafter, the lower level syntax (e.g., APS) may individually parse the scaling list (scaling_list_data( )) based on the enabled flag (scaling_list_enabled_flag) in the SPS. Accordingly, according to an embodiment of the present disclosure, the scaling list data can be parsed/signaled in accordance with the hierarchical structure, and thus the coding efficiency can be further improved.

Further, in signaling the scaling list data in the APS, the APS ID may be signaled in the slice header, the APS may be identified based on the APS ID obtained from the slice header, and the scaling list data may be parsed/signaled from the identified APS. Here, the slice header has been explained as one example only, and may be interchangeably used with or replaced by various headers, such as a tile group header or a picture header.

For example, the following Table 40 represents an example of a slice header syntax including the APS ID syntax element in order to signal the scaling list data in the APS.

TABLE 40

| | Descriptor |
|---|---|
| slice_header( ) { | |
|   slice_pic_parameter_set_id | ue(v) |
|   ... | |
|   if( scaling_list_enabled_flag ) { | |
|     slice_scaling_list_present_flag | u(1) |
|     if(slice_scaling_list_present_flag) { | |
|       slice_scaling_list_aps_id | u(5) |
|     } | |
|   } | |
|   ... | |
|   byte_alignment( ) | |
| } | |

The semantics of syntax elements included in the slice header syntax of Table 40 may be expressed as shown in Table 41 below.

TABLE 41

When present, the value of each of the slice header syntax elements
slice_pic_parameter_set_id, slice_pic_order_cnt_lsb, and
slice_temporal_mvp_enabled_flag shall be the same in all slice headers of a coded picture.
slice_pic_parameter_set_id specifies the value of pps_pic_parameter_set_id for the PPS in
use. The value of slice_pic_parameter_set_id shall be in the range of 0 to 63, inclusive.
slice_scaling_list_present_flag equal to 1 specifies that scaling list matrices is present for
the current slice. slice_scaling_list_present_flag equal to 0 specifies that the default scaling
list data are used to derive the array ScalingFactor as described in scaling list data semantics
as specified in 7.4.7.12. When slice_scaling_list_enabled_flag is not present, it is inferred to
be equal to 0.
slice_scaling_list_aps_id specifies the adaptation_parameter_set_id of the SCALING
DATA APS that the slice refers to. The TemporalId of the SCALING DATA APS NAL unit
having adaptation_parameter_set_id equal to slice_scaling_list_aps_id shall be less than or
equal to the TemporalId of the coded slice NAL unit. If slice_scaling_list_aps_id is not
present, it is inferred to be 0.
When multiple SCALING DATA APSs with the same value of adaptation_parameter_set_id
are referred to by two or more slices of the same picture, the multiple SCALING DATA APSs
with the same value of adaptation_parameter_set_id shall have the same content.

Referring to Table 40 and Table 41 above, the slice_pic_parameter_set_id syntax element may be parsed/signaled in the slide header. The slice_pic_parameter_set_id syntax element may represent an identifier for the PPS being used. That is, the slice_pic_parameter_set_id syntax element may be information for identifying the PPS being referred to by the corresponding slice, and may represent the value of the pps_pic_parameter_set_id. The value of the slice_pic_parameter_set_id should be in the range of 0 to 63. The slice_pic_parameter_set_id syntax element may be referred to as PPS identification information or PPS ID information being referred to by the slice.

Further, the slice_scaling_list_present_flag syntax element may be parsed/signaled in the slice header. The slice_scaling_list_present_flag syntax element may be information for representing whether the scaling list matrix is present for the current slice. For example, if the value of the slice_scaling_list_present_flag is equal to 1, it may represent that the scaling list matrix is present for the current slice, and if the value of the slice_scaling_list_present_flag is equal to 0, it may represent that default scaling list data is used to derive a scaling factor (ScalingFactor) array. Further, if the slice_scaling_list_present_flag is not present in the slice header, the value may be inferred to be equal to 0.

In this case, whether to parse the slice_scaling_list_present_flag syntax element may be determined based on the scaling_list_enabled_flag syntax element being signaled at the upper level syntax (i.e., SPS). For example, if the value of the scaling_list_enabled_flag being signaled in the SPS is equal to 1 (i.e., if it is determined that the scaling list data is used at the upper level), the slice_scaling_list_present_flag may be parsed in the slice header, and it may be determined whether to perform the scaling process using the scaling list in the corresponding slice.

Further, the slice_scaling_list_aps_id syntax element may be parsed/signaled in the slice header. The slice_scaling_list_aps_id syntax element may represent the identifier for the APS being referred to by the corresponding slice. That is, the slice_scaling_list_aps_id syntax element may represent the ID information (adaptation_parameter_set_id) of the APS including the scaling list data being referred to by the corresponding slice. Meanwhile, the TemporalId (i.e., Temporal ID) of the APS NAL unit (i.e., APS NAL unit including the scaling list data) having the same APS ID information (adaptation_parameter_set_id) as the slice_scaling_list_aps_id should be equal to or smaller than the TemporalId (i.e., Temporal ID) of the slice NAL unit being coded.

Further, whether to parse the slice_scaling_list_aps_id syntax element may be determined based on the slice_scaling_list_present_flag syntax element. For example, if the value of the slice_scaling_list_present_flag is equal to 1 (i.e., if the scaling list is present in the slice header), the slice_scaling_list_aps_id can be parsed. Thereafter, the scaling list data can be obtained from the APS indicated by the parsed slice_scaling_list_aps_id.

Further, in case that a plurality of SCALING DATA APSs (a plurality of APSs including the scaling list data) having the APS ID information (adaptation_parameter_set_id) of the same value are referred to by two or more slices in the same picture, the plurality of SCALING DATA APSs having the APS ID information (adaptation_parameter_set_id) of the same value should include the same contents.

According to Table 40 and Table 41 as described above, although it has been explained that the APS ID is signaled in the slice header, this is merely one example, and in the present disclosure, the APS ID can be signaled in the picture header or the tile group header.

Further, the present disclosure proposes a general scheme for repositioning the scaling list data in another header set. As an embodiment, a general structure including the scaling list data in the header set is proposed. In case of the current VVC, the APS is used as an appropriate header set, but it is also possible to encapsulate the scaling list data identified by the Nal unit type (NUT) in its header set. It may be implemented as in the following Table 42 and Table 43.

For example, the following Table 42 shows an example representing the NAL unit type and the corresponding RBSP syntax structure. Here, as described above, the NAL unit type may be specified depending on the RBSP data structure included in the corresponding NAL unit, and information about the NAL unit type may be signaled to be stored in the NAL unit header.

TABLE 42

| NalUnitType | Name of NalUnitType | Content of NAL unit and RBSP syntax structure | NAL unit type class |
|---|---|---|---|
| 0 | PPS_NUT | Picture parameter set pic_parameter_set_rbsp( ) | non-VCL |
| 1 | AUD_NUT | Access unit delimiter access_unit_delimiter_rbsp( ) | non-VCL |
| 2 | PREFIX_SEI_NUT | Supplemental enhancement information sei_rbsp( ) | non-VCL |
| 3 | SUFFIX_SEI_NUT | | |
| 4 | APS_NUT | Adaptation parameter set adaptation_parameter_set_rbsp( ) | non-VCL |
| 6<br>5 . . . 7 | RSV_NVCL65 . . .<br>RSV_NVCL7 | Reserved | non-VCL |
| 8 | TRAIL_NUT | Coded slice of a non-STSA trailing picture slice_layer_rbsp( ) | VCL |
| 9 | STSA_NUT | Coded slice of an STSA picture slice_layer_rbsp( ) | VCL |
| 10 | RADL_NUT | Coded slice of a RADL picture slice_layer_rbsp( ) | VCL |
| 11 | RASL_NUT | Coded slice of a RASL picture slice_layer_rbsp( ) | VCL |
| 12 . . . 15 | RSV_VCL_12 . . .<br>RSV_VCL_15 | Reserved non-IRAP VCL NAL unit types | VCL |
| 16 | DPS_NUT | Decoding parameter set decoding_parameter_set_rbsp( ) | non-VCL |
| 17 | SPS_NUT | Sequence parameter set seq_parameter_set_rbsp( ) | non-VCL |
| 18 | EOS_NUT | End of sequence end_of_seq_rbsp( ) | non-VCL |
| 19 | EOB_NUT | End of bitstream end_of_bitstream_rbsp( ) | non-VCL |
| 20 | VPS_NUT | Video parameter set video_parameter_set_rbsp( ) | non-VCL |
| 21 | SCALING_NUT | Scaling_list_data_parameter set Scaling_list_data _parameter_set_rbsp( ) | non-VCL |
| 22 . . . 23 | RSV_NVCL21 . . .<br>RSV_NVCL23 | Reserved | non-VCL |
| 24 | IDR_W_RADL | Coded slice of an IDR picture slice_layer_rbsp( ) | VCL |
| 25 | IDR_N_LP | | |
| 26 | CRA_NUT | Coded slice of a CRA picture slice_layer_rbsp( ) | VCL |
| 27 | GRA_NUT | Coded slice of a gradual random access picture slice_layer_rbsp( ) | VCL |
| 28 . . . 31 | UNSPEC28 . . .<br>UNSPEC31 | Unspecified | non-VCL |

As shown in Table 42 above, the scaling list data may be defined as one NAL unit type (e.g., SCALING_NUT), and as the value of the NAL unit type for the SCALING_NUT, a specific value (e.g., 21 or one of reserved values being not specified as the NAL unit type) May be specified. The SCALING_NUT may be the type for the NAL unit including the scaling list data parameter set (e.g., Scaling_list_data_parameter set).

Further, whether the SCALING_NUT is used may be determined at an upper level than the APS, PPS, and/or another appropriate header, or may be determined at a lower level than another NAL unit type.

For example, the following Table 43 represents syntaxes of a scaling list data parameter set used for signaling the scaling list data.

TABLE 43

| | Descriptor |
|---|---|
| scaling_list_data_parameter_set_rbsp( ) { | |
|   scaling_list_data_parameter_set_id | u(5) |
|   scaling_list_data( ) | |
|   scaling_list_data_extension_flag | u(1) |
|   if(scaling_list_data_extension_flag ) | |
|     while( more_rbsp_data( ) ) | |
|       scaling_list_data_extension_data_flag | u(1) |
|   rbsp_trailing_bits( ) | |
| } | |

The semantics of syntax elements included in the scaling list data parameter set syntax of Table 43 may be expressed as shown in Table 44 below.

TABLE 44 scaling_list_data _parameter_set_id provides an identifier for the scaling_list_data for reference by other syntax elements.
  NOTE - scaling_list_data_parameter_sets can be shared across pictures and can be different in different slices within a picture.
scaling_list_data _extension_flag equal to 0 specifies that no aps_extension_data_flag syntax elements are present in the scaling_list_data RBSP syntax structure.
scaling_list_data _extension_flag equal to 1 specifies that there are scaling_list_data_extension_data_flag syntax elements present in the scaling_list_data RBSP syntax structure.

TABLE 44-continued scaling_list_data_extension_data_flag may have any value. Its presence and value do not
affect decoder conformance to profiles specified in this version of this Specification.
Decoders conforming to this version of this Specification shall ignore all
scaling_list_data_extension_data_flag syntax elements.

Referring to Table 43 and Table 44 above, the scaling list data parameter set (e.g., scaling_list_data_parameter_set) may be a header set specified by the value (e.g., 21) of the NAL unit type for the SCALING_NUT. The scaling_list_data_parameter_set_id syntax element may be parsed/signaled in the scaling list data parameter set. The scaling_list_data_parameter_set_id syntax element provides an identifier for the scaling list data for reference of other syntax elements. That is, the scaling list parameter set may be identified based on the scaling_list_data_parameter_set_id syntax element. The scaling_list_data_parameter_set_id syntax element may be called scaling list data parameter set ID information. The scaling list data parameter set may be shared between the pictures, and may be different in different slices in the picture.

The scaling list data (e.g., scaling_list_data syntax) may be parsed/signaled from the scaling list data parameter set identified by the scaling_list_data_parameter_set_id.

Further, the scaling_list_data_extension_flag syntax element may be parsed/signaled in the scaling list data parameter set. The scaling_list_data_extension_flag syntax element may represent whether the scaling list data extension flag (scaling_list_data_extension_flag) syntax element is present in the scaling list data RBSP syntax structure. For example, if the value of the scaling_list_data_extension_flag is equal to 1, it may be represented that the scaling list data extension flag (scaling_list_data_extension_flag) syntax element is present in the scaling list data RBSP syntax structure. Further, if the value of the scaling_list_data_extension_flag is equal to 0, it may be represented that the scaling list data extension flag (scaling_list_data_extension_flag) syntax element is not present in the scaling list data RBSP syntax structure.

The scaling_list_data_extension_data_flag syntax element may be parsed/signaled based on the scaling_list_data_extension_flag syntax element. The scaling_list_data_extension_data_flag syntax element may be called an extension data flag for the scaling list data. For example, if the value of the scaling_list_data_extension_flag is equal to 1, the scaling_list_data_extension_data_flag may be parsed/signaled, and in this case, the scaling_list_data_extension_data_flag may have a random value.

As described above, according to an embodiment of the present disclosure, one header set structure for the scaling list data may be defined and used, and the header set for the scaling list data may be specified as the NAL unit type (e.g., SCALING_NUT). In this case, the header set for the scaling list data may be defined as the scaling list data parameter set (e.g., scaling_list_data_parameter_set), and from this, the scaling list data can be obtained.

Meanwhile, the present disclosure proposes a scheme for effectively coding the syntax element (scaling_list_pred_matrix_id_delta) included in the scaling list data.

In case of the current VVC, the scaling_list_pred_matrix_id_delta syntax element is coded using an unsigned integer 0-th order Exp-Golomb-coded syntax element with the left bit first. However, in order to improve the coding efficiency, an embodiment of the present disclosure proposes a scheme for coding using a fixed length code (e.g., u(3)) with respect to the scaling_list_pred_matrix_id_delta syntax element having a range of 0 to 5 as in the following Table 45. In this case, in order to improve efficiency for the overall range, it may be enough to perform coding by using only three bits.

For example, the following Table 45 represents an example of a scaling list data syntax structure.

TABLE 45

| | Descriptor |
|---|---|
| scaling_list_data( ) { | |
|   for( sizeId = 1; sizeId < 7; sizeId++ ) | |
|     for( matrixId = 0; matrixId < 6; matrixId ++ ) { | |
|       if( ! ( ( (( sizeId == 1 ) && ( matrixId % 3 == 0 ) ) || (( sizeId == 6 ) && ( matrixId % 3 != 0 ) )) ) { | |
|         scaling_list_pred_mode_flag[ sizeId ][ matrixId ] | u(1) |
|         if( !scaling_list_pred_mode_flag[ sizeId ][ matrixId ] ) | |
|           scaling_list_pred_matrix_id_delta[ sizeId ][ matrixId ] | u(3) |
|         else { | |
|           nextCoef = 8 | |
|           coefNum = Min( 64, ( 1 << ( sizeId << 1 ) ) ) | |
|           if( sizeId > 3 ) { | |
|             scaling_list_dc_coef_minus8[ sizeId − 4 ][ matrixId ] | se(v) |
|             nextCoef = | |
| scaling_list_dc_coef_minus8[ sizeId − 4 ][ matrixId ] + 8 | |
|           } | |
|           for( i = 0; i < coefNum; i++ ) { | |
|             x = DiagScanOrder[ 3 ][ 3 ][ i ][ 0 ] | |
|             y = DiagScanOrder[ 3 ][ 3 ][ i ][ 1 ] | |
|             if ( !(sizeId==6 && x>=4 && y>=4) ) { | |
|               scaling_list_delta_coef | se(v) |
|             nextCoef = | |
| ( nextCoef + scaling_list_delta_coef + 256) % 256 | |

TABLE 45-continued

| | Descriptor |
|---|---|
| ScalingList[ sizeId ][ matrixId ][ i ] = nextCoef<br>}<br>}<br>}<br>}<br>}<br>}<br>} | |

The semantics of syntax elements included in the scaling list data syntax of Table 45 may be expressed as shown in Table 46 below.

TABLE 46 scaling_list_pred_mode_flag[ sizeId ][ matrixId ] equal to 0 specifies that the values of the scaling list are the same as the values of a reference scaling list. The reference scaling list is specified by scaling_list_pred_matrix_id_delta[ sizeId ][ matrixId ].
scaling_list_pred_mode_flag[ sizeId ][ matrixId ] equal to 1 specifies that the values of the scaling list are explicitly signalled.
scaling_list_pred_matrix_id_delta[ sizeId ][ matrixId ] specifies the reference scaling list used to derive ScalingList[ sizeId ][ matrixId ], the derivation of ScalingList[ sizeId ][ matrixId ] is based on scaling_list_pred_matrix_id_delta[ sizeId ][ matrixId ] as follows:
– If scaling_list_pred_matrix_id_delta[ sizeId ][ matrixId ] is equal to 0, the scaling list is inferred from the default scaling list ScalingList[ sizeId ][ matrixId ][ i ] as specified in Table 7-15, Table 7-16, Table 7-17 , Table 7-18 for i = 0..Min( 63, ( 1 << ( sizeId << 1 ) ) – 1 ).
– Otherwise, the scaling list is inferred from the reference scaling list as follows: For sizeId =1... 6,
    refMatrixId = matrixId –
      scaling_list_pred_matrix_id_delta[ sizeId ][ matrixId ] * ( sizeId == 6 ? 3 : 1 )
        If sizeId is equal to 1, the value of refMatrixId shall not be equal to 0 or 3.
Otherwise, if sizeId is less than or equal to 5, the value of
scaling_list_pred_matrix_id_delta[ sizeId ][ matrixId ] shall be in the range of 0 to matrixId, inclusive. Otherwise (sizeId is equal to 6), the value of
scaling_list_pred_matrix_id_delta[ sizeId ][ matrixId ] shall be in the range of 0 to matrixId / 3, inclusive.
scaling_list_dc_coef_minus8[ sizeId ][ matrixId ] plus 8 specifies the value of the variable ScalingFactor[ 4 ][ matrixId ][ 0 ][ 0 ] for the scaling list for the 16x16 size when sizeId is equal to 4 and specifies the value of ScalingFactor[ 5 ][ matrixId ][ 0 ][ 0 ] for the scaling list for the 32x32 size when sizeId is equal to 5, and specifies the value of ScalingFactor[ 6 ][ matrixId ][ 0 ][ 0 ] for the scaling list for the 64x64 size when sizeId is equal to 6. The value of
scaling_list_dc_coef_minus8[ sizeId ][ matrixId ] shall be in the range of –7 to 247, inclusive.
When scaling_list_pred_mode_flag[ sizeId ][ matrixId ] is equal to 0,
scaling_list_pred_matrix_id_delta[ sizeId ][ matrixId ] is equal to 0 and sizeId is greater than 3, the value of scaling_list_dc_coef_minus8[ sizeId ][ matrixId ] is inferred to be equal to 8.
When scaling_list_pred_matrix_id_delta[ sizeId ][ matrixId ] is not equal to 0 and sizeId is greater than 3, the value of scaling_list_dc_coef_minus8[ sizeId ][ matrixId ] is inferred to be equal to scaling_list_dc_coef_minus8[ sizeId ][ refMatrixId ], where the value of refMatrixId is given by Equation 7-XX.
scaling_list_delta_coef specifies the difference between the current matrix coefficient ScalingList[ sizeId ][ matrixId ][ i ] and the previous matrix coefficient
ScalingList[ sizeId ][ matrixId ][ i – 1 ], when scaling_list_prod_mode_flag[ sizeId ][ matrixId ] is equal to 1. The value of scaling_list_delta_coef shall be in the range of –128 to 127, inclusive. The value of ScalingList[ sizeId ][ matrixId ][ i ] shall be greater than 0. When
scaling_list_pred_mode_flag[ sizeId ][ matrixId ] is equal to 1 and scaling_list_delta_coef is not present, the value of ScalingList[ sizeId ][ matrixId ][ i ] is inferred to be 0.

As shown in Table 45 and Table 46 above, the scaling_list_pred_matrix_id_delta syntax element may be parsed/signaled from the scaling list data syntax. The scaling_list_pred_matrix_id_delta syntax element may represent a reference scaling list used to derive the scaling list. In this case, in parsing the scaling_list_pred_matrix_id_delta, the fixed length code (e.g., u(3)) may be used.

Meanwhile, in signaling scaling list data in an APS, restrictions may be imposed on a scaling list matrix. Accordingly, this document proposes a method of limiting the number of scaling list matrices. According to a method proposed in this document, effects in that an implementation is facilitated and the worst case memory requirement is limited can be obtained.

In an embodiment, the number of APSs (i.e., an APS that signals a scaling list data syntax) including scaling list data may be limited. To this end, the following constraint condition may be added. Such a constraint condition is for placing holders. That is, a different value may be used. (It should be noted that these constraints are meant to place holders i.e., different values can be used.)

For convenience of description, an APS including scaling list data (i.e., an APS that signals a scaling list data syntax) may be denoted as SCALING LIST APS. In other words, as described above, if an APS parameter type (e.g., aps_params_type) transmitted in an APS is a type (e.g., SCALING_APS) indicating the scaling list data parameters, scaling list data transmitted in the APS may be indicated as SCALING LIST APS.

For example, a total number of APSs (i.e., SCALING LIST APS) including scaling list data may be smaller than 3. Of course, another proper value may be used. For example, another proper value may be used within a range of 0 to 7. That is, a total number of APSs (i.e., SCALING LIST APS) including scaling list data may be determined in a range of 0 to 7.

Furthermore, for example, the APS (i.e., SCALING LIST APS) including scaling list data may be permitted for only one SCALING LIST APS per picture.

Table 47 below is an example illustrating a syntax element indicating the constraint condition for limiting an APS including scaling list data and semantics thereof.

TABLE 47 slice_scaling_list_aps_id specifies the adaptation_parameter_set_id of the SCALING LIST APS that the slice refers to. The value of slice_scaling_list_aps_id shall be in the range of 0 to 3, inclusive. The TemporalId of the SCALING_LIST APS NAL unit having adaptation_parameter_set_id equal to slice_lmcs_aps_id shall be less than or equal to the TemporalId of the coded slice NAL unit.
When multiple SCALING LIST APSs with the same value of adaptation parameter_set_id are referred to by two or more slices of the same picture, the multiple SCALING LIST APSs with the same value of adaptation_parameter_set_id shall have the same content.
Only one SCALING LIST APS with the same value of adaptation_parameter_set_id and the same content shall be referred to by one or more slices of the same picture.

Referring to Table 47, the number of APSs (i.e., SCALING LIST APS) including scaling list data may be limited based on a syntax element (e.g., slice_scaling_list_aps_id) indicating APS ID information (i.e., APS ID information) of SCALING LIST APS.

For example, the syntax element (slice_scaling_list_aps_id) may indicate APS ID information (i.e., APS ID information) of SCALING LIST APS referred by a slice. In this case, a value of the syntax element (slice_scaling_list_aps_id) may be limited to a specific value. For example, a value of the syntax element (slice_scaling_list_aps_id) may be limited to be in a range of 0 to 3. This is merely an example, and may be limited to have another value. For another example, a value of the syntax element (slice_scaling_list_aps_id) may be limited to be in a range of 0 to 7.

Furthermore, for example, TemporalId (i.e., Temporal ID) of a SCALING LIST APS NAL unit having an APS ID (adaptation_parameter_set_id), such as slice_lmcs_aps_id, needs to be smaller than or equal to TemporalId (i.e., Temporal ID) of a coded slice NAL unit.

Furthermore, for example, if a plurality of the same SCALING LIST APSs having the same APS ID (adaptation_parameter_set_id) value is referred by two slices on the same picture, the plurality of SCALING LIST APSs having the same APS ID (adaptation_parameter_set_id) value needs to have the same contents.

Furthermore, for example, only one SCALING LIST APS having the same APS ID (adaptation_parameter_set_id) value and the same contents needs to be referred by one or more slices on the same picture. In other words, the one or more slices within the same picture need to refer to the same APS including scaling list data.

The following drawings have been written in order to describe detailed examples of this document. The name of a detailed apparatus or the name of a detailed term (e.g., the name of a syntax/syntax element) written in the drawings has been illustratively proposed, and technical characteristics of this document are not limited by a detailed name used in the following drawings.

Figure 7:
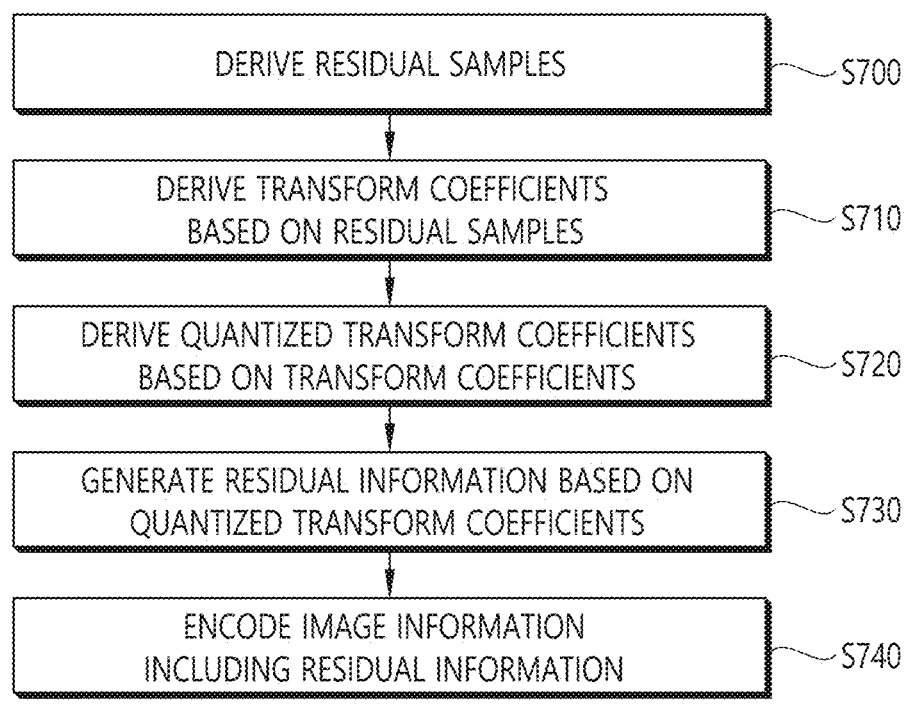
FIGS. 7 and 8 schematically illustrate examples of a video/image encoding method and related components according to an embodiment(s) of this document.
Figure 8:
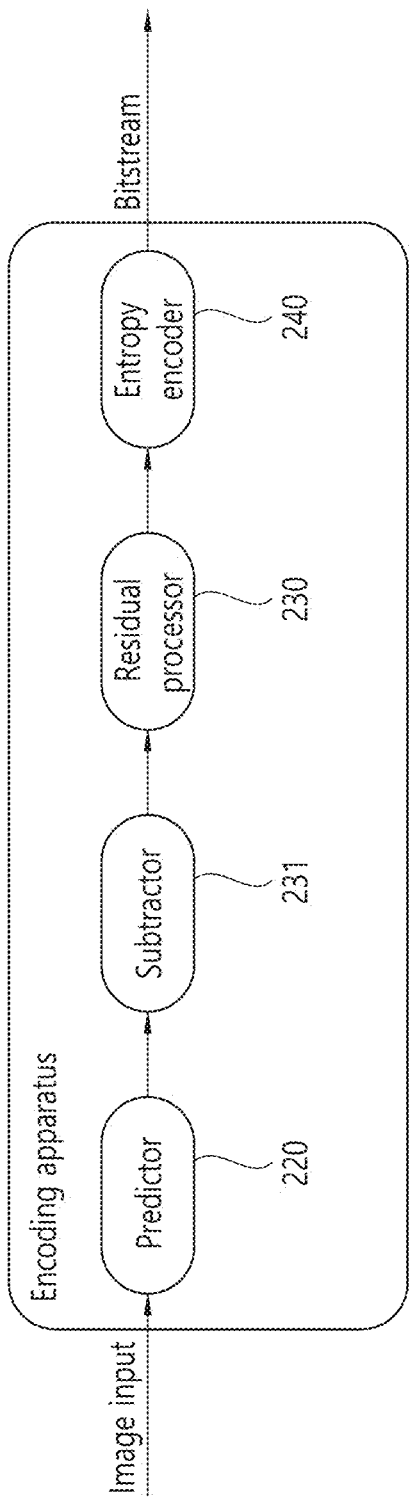

FIGS. 7 and 8 schematically illustrate examples of a video/image encoding method and related components according to an embodiment(s) of this document.

The method disclosed in FIG. 7 may be performed by the encoding apparatus 200 disclosed in FIG. 2. Specifically, step S700 in FIG. 7 may be performed by the subtractor 231 disclosed in FIG. 2. Step S710 in FIG. 7 may be performed by the transformer 232 disclosed in FIG. 2. Steps S720 to S730 in FIG. 7 may be performed by the quantizer 233 disclosed in FIG. 2. Step S740 in FIG. 7 may be performed by the entropy encoder 240 disclosed in FIG. 2. Furthermore, the method disclosed in FIG. 7 may be performed by including the embodiments described in this document. Accordingly, a detailed description of contents redundant with the aforementioned embodiments in FIG. 7 is omitted or simply given.

Referring to FIG. 7, the encoding apparatus may derive residual samples for a current block (S700).

In an embodiment, first, the encoding apparatus may determine a prediction mode for the current block and derive prediction samples. For example, the encoding apparatus may determine whether to perform inter prediction or intra prediction on the current block, and may determine a detailed inter prediction mode or a detailed intra prediction mode based on RD costs. The encoding apparatus may derive the prediction samples for the current block by performing prediction based on the determined prediction mode. In this case, various prediction methods disclosed in this document, such as inter prediction or intra prediction, may be applied. Furthermore, the encoding apparatus may generate and encode information (e.g., prediction mode information) related to the prediction applied to the current block. Furthermore, the encoding apparatus may derive residual samples by comparing original samples and the prediction samples for the current block.

The encoding apparatus may derive transform coefficients based on the residual samples (S710).

In an embodiment, the encoding apparatus may derive the transform coefficients through a transform process for the residual samples. In this case, the encoding apparatus may determine whether to apply a transform on the current block by considering coding efficiency. That is, the encoding apparatus may determine whether a transform is applied to the residual samples. For example, if the transform is not applied to the residual samples, the encoding apparatus may derive the residual samples as the transform coefficients. Alternatively, if the transform is applied to the residual samples, the encoding apparatus may derive the transform coefficients by performing the transform on the residual samples. In this case, the encoding apparatus may generate and encode transform skip flag information based on whether the transform is applied to the current block. The transform skip flag information may be information indicating whether a transform is applied to the current block or a transform is skipped.

The encoding apparatus may derive quantized transform coefficients based on the transform coefficients (S720).

In an embodiment, the encoding apparatus may derive the quantized transform coefficients by applying a quantization process for the transform coefficients. In this case, the encoding apparatus may apply frequency weighting quantization that adjusts quantization intensity depending on a frequency. In this case, the quantization process may be further performed based on a frequency-specific quantization scale value. The quantization scaling value for frequency weighting quantization may be derived using a scaling matrix. For example, the encoding apparatus/decoding apparatus may use a predefined scaling matrix. The encoding apparatus may construct and encode the frequency-specific quantization scaling information for a scaling matrix, and may signal the frequency-specific quantization scaling information to the decoding apparatus. The frequency-specific quantization scaling information may include scaling list data. A (modified) scaling matrix may be derived based on the scaling list data.

Furthermore, the encoding apparatus may perform a dequantization process in the same way as the decoding apparatus. In this case, the encoding apparatus may derive a (modified) scaling matrix based on the scaling list data, and may derive reconstructed transform coefficients by applying dequantization to the quantized transform coefficients based on the (modified) scaling matrix. In this case, the reconstructed transform coefficients may be different from the initial transform coefficients due to a loss in the transform/quantization process.

In this case, the scaling matrix may denote the aforementioned frequency-based quantization scaling matrix, and may be interchangeably or alternately used with a quantization scaling matrix, a quantization matrix, a scaling matrix, or a scaling list for convenience of description, and is not limited to a detailed name used in the present embodiment.

That is, the encoding apparatus may further apply frequency weighting quantization in performing the quantization process. In this case, scaling list data may be generated as information for a scaling matrix. The process has been described in detail by taking Table 5 to Table 17 as examples, and thus in the present embodiment, redundant contents or a detailed description is omitted.

The encoding apparatus may generate residual information based on the quantized transform coefficients (S730).

In this case, the residual information is information generated through the transform and/or quantization procedure, and may be information about the quantized transform coefficients. For example, the residual information may include information, such as value information, position information, a transform scheme, a transform kernel, or a quantization parameter of the quantized transform coefficients.

Furthermore, if the frequency weighting quantization is further applied in deriving the quantized transform coefficients in the quantization process, scaling list data for the quantized transform coefficients may be further generated. The scaling list data may include scaling list parameters used to derive the quantized transform coefficients. In this case, the encoding apparatus may generate scaling list data-related information, and may generate an APS including scaling list data, for example.

The encoding apparatus may encode image information (or video information) (S740). In this case, the image information may include the residual information. Furthermore, the image information may include information (e.g., prediction mode information) related to the prediction used to derive the prediction samples. Furthermore, the image information may include information on the scaling list data. That is, the image information may include various types of information derived in an encoding process, and may be encoded by including the various types of information.

In an embodiment, the image information may include various types of information according to the aforementioned embodiment(s) of this document, and may include the information disclosed in at least one of Tables 1 to 47.

For example, the image information may include an adaptation parameter set (APS). The APS may include APS ID information and APS type information (type information of APS parameters). That is, the APS may be identified based on the APS ID information, and APS parameters corresponding to a corresponding type may be included in the APS based on the APS type information. For example, the APS type information may include an ALF type for adaptive loop filter (ALF) parameters, an LMCS type for luma mapping with chroma scaling (LMCS) parameters, and a scaling list type for scaling list data parameters, and may be illustrated as in Table 35. For example, when a value of the APS type information is 2, this may indicate that the APS type information is an APS including scaling list data parameters.

For example, the APS may be constructed like Table 33 (or Table 18). The APS ID information may be adaptation_parameter_set_id described in Table 33 and Table 34 (or Table 18 and Table 19). The APS type information may be aps_params_type described in Table 33 to Table 35 (or Table 18 to Table 20). For example, if the type information of APS parameters (e.g., aps_params_type) is a SCALING_APS type related to indicating an APS including scaling list data (or when a value of type information (e.g., aps_params_type) of APS parameters is 2), the APS may include scaling list data (e.g., scaling_list_data( )). That is, the encoding apparatus may signal the scaling list data (e.g., scaling_list_data( )) through the APS based on SCALING_APS type information related to indicating an APS including the scaling list data. That is, the scaling list data may be included in the APS based on the APS type information (SCALING_APS type information). The scaling list data, as described above, may include scaling list parameters for deriving a scaling list/scaling matrix/scale factor used in the quantization/dequantization process. In other words, the scaling list data may include syntax elements used to construct a scaling list.

Furthermore, for example, the APS ID information may have a value within a specific range. For example, a value of the APS ID information may have a value within a specific range from 0 to 3 or from 0 to 7. This has been merely described as an example, and the range of a value of the APS ID information may have different values. Furthermore, the range of a value of the APS ID information may be determined based on the APS type information (e.g., aps_params_type). If APS type information indicates an APS for scaling list data (e.g., SCALING_APS type), a value of APS ID information may be indicated based on a syntax element (e.g., slice_scaling_list_aps_id), such as that in Table 47. For example, if APS type information (e.g., aps_params_type) indicates an APS including scaling list data (e.g., in the case of the SCALING_APS type), a value of APS ID information may have a value within a range from 0 to 3 or 0 to 7. In this case, slices within one picture may refer to the same APS for scaling list data. Alternatively, if APS type information (e.g., aps_params_type) indicates an APS for an ALF (e.g., in the case of an ALF_APS type), a value of APS ID information may have a value within a range from 0 to 7. Alternatively, if APS type information (e.g., aps_params_type) indicates an APS for LMCS (e.g., in the case of an LMCS_APS type), a value of APS ID information may have a value within a range from 0 to 3.

Furthermore, for example, the image information may include a sequence parameter set (SPS). The SPS may include first enabled flag information related to indicating whether scaling list data is used. For example, the SPS may be constructed like Table 36 (or Table 21). The first enabled flag information may be scaling_list_enabled_flag described in Table 36 and Table 37 (or Table 21 and Table 22). Furthermore, a sps_scaling_list_data_present_flag syntax element may be removed from the SPS so that flag information is not parsed/signaled. The sps_scaling_list_data_present_flag syntax element may be information related to indicating whether a syntax structure of scaling list data is present in the SPS. Scaling list data designated by the SPS may be parsed/signaled based on the flag information. However, the sps_scaling_list_data_present_flag syntax element may be removed, and thus the SPS may be constructed to not directly signal the scaling list data and to explicitly signal only a scaling list-enabled flag (scaling_list_enabled_flag) in an SPS level.

Furthermore, for example, the image information may include a picture parameter set (PPS). For example, the PPS may be constructed like Table 38. In this case, the PPS may be constructed to not include enabled flag information related to indicating whether scaling list data is used. That is, the PPS may be constructed so that the flag information is not parsed/signaled by removing a pps_scaling_list_data_present_flag syntax element from the PPS. The pps_scaling_list_data_present_flag syntax element is flag information related to indicating whether a syntax structure of scaling list data is present in the PPS. Scaling list data designated by the PPS may be parsed/signaled based on the flag information. However, by removing the pps_scaling_list_data_present_flag syntax element, the scaling list data may not be directly signaled in a PPS level.

In this case, first enabled flag information (e.g., scaling_list_enabled_flag) related to indicating whether the scaling list data is used may be signaled in an SPS and may not be signaled in a PPS. Accordingly, scaling list data included in the APS may be obtained based on the first enabled flag information signaled in the SPS (e.g., when a value of the first enabled flag information (e.g., scaling_list_enabled_flag) is 1 or true).

Furthermore, for example, the image information may include header information. The header information may be header information related to a slice or picture including a current block, and may include a picture header or a slice header, for example. The header information may include scaling list data-related APS ID information. The scaling list data-related APS ID information included in the header information may indicate APS ID information for an APS including scaling list data. For example, the scaling list data-related APS ID information included in the header information may be slice_scaling_list_aps_id described in Table 40 to Table 41 (or Table 25 to Table 28), and may be ID information for an APS (including scaling list data, that is, SCALING LIST APS) referred by a slice/picture including a current block. That is, an APS including scaling list data may be identified based on scaling list data-related APS ID information (e.g., slice_scaling_list_aps_id) of the header information.

In this case, whether the header information parses/signals APS ID information for an APS including scaling list data may be determined based on the first enabled flag information (scaling_list_enabled_flag) parsed/signaled in the SPS. For example, the header information may include APS ID information for an APS including scaling list data based on the first enabled flag information related to indicating that a scaling list in an SPS is used (e.g., when a value of the first enabled flag information (e.g., scaling_list_enabled_flag) is 1 or true).

Furthermore, for example, the header information may include second enabled flag information related to indicating whether scaling list data in a picture or slice is used. For example, the second enabled flag information may be slice_scaling_list_present_flag (or slice_scaling_list_enabled_flag) described in Table 40 and Table 41 (or Table 25 to Table 28).

In this case, whether the header information parses/signals the second enabled flag information may be determined based on the first enabled flag information (scaling_list_enabled_flag) parsed/signaled in the SPS. For example, the header information may include the second enabled flag information based on the first enabled flag information related to indicating that a scaling list in the SPS is used (e.g., when a value of the first enabled flag information (e.g., scaling_list_enabled_flag) is 1 or true). Furthermore, the header information may include APS ID information for an APS including scaling list data based on the second enabled flag information (e.g., when a value of the second enabled flag information (e.g., slice_scaling_list_present_flag) is 1 or true).

For example, the encoding apparatus may signal the second enabled flag information (e.g., slice_scaling_list_present_flag) through the header information based on the first enabled flag information (e.g., scaling_list_enabled_flag) signaled in the SPS as in Table 40, and may then signal the APS ID information (e.g., slice_scaling_list_aps_id) for the APS including scaling list data through the header information based on the second enabled flag information (e.g., slice_scaling_list_present_flag). Furthermore, the encoding apparatus may signal scaling list data from an APS indicated by the signaled APS ID information (e.g., slice_scaling_list_aps_id).

As described above, an SPS syntax and a PPS syntax may be constructed so that scaling list data syntax is not directly signaled in an SPS or PPS level. For example, only a scaling list-enabled flag (scaling_list_enabled_flag) may be explicitly signaled in an SPS. Thereafter, scaling list (scaling_list_data( )) may be individually parsed in a lower level syntax (e.g., an APS) based on an enabled flag (scaling_list_enabled_flag) in the SPS. Accordingly, according to an embodiment of this document, coding efficiency can be further improved because scaling list data can be parsed/signaled depending on a hierarchical structure.

The image information including the aforementioned various types of information may be encoded and outputted in the form of a bitstream. The bitstream may be transmitted to the decoding apparatus over a network or through a (digital) storage medium. In this case, the network may include a broadcasting network and/or a communication network, and the digital storage medium may include various storage media, such as a USB, an SD, a CD, a DVD, Blueray, an HDD, and an SSD.

Figure 9:
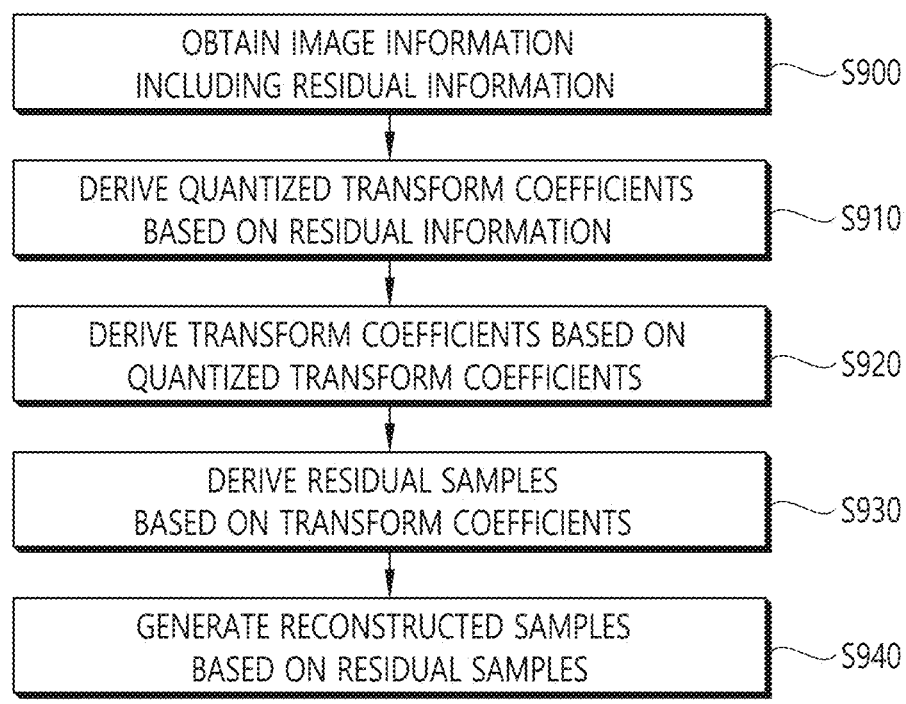
FIGS. 9 and 10 schematically illustrate examples of a video/image decoding method and related components according to an embodiment(s) of this document.
Figure 10:
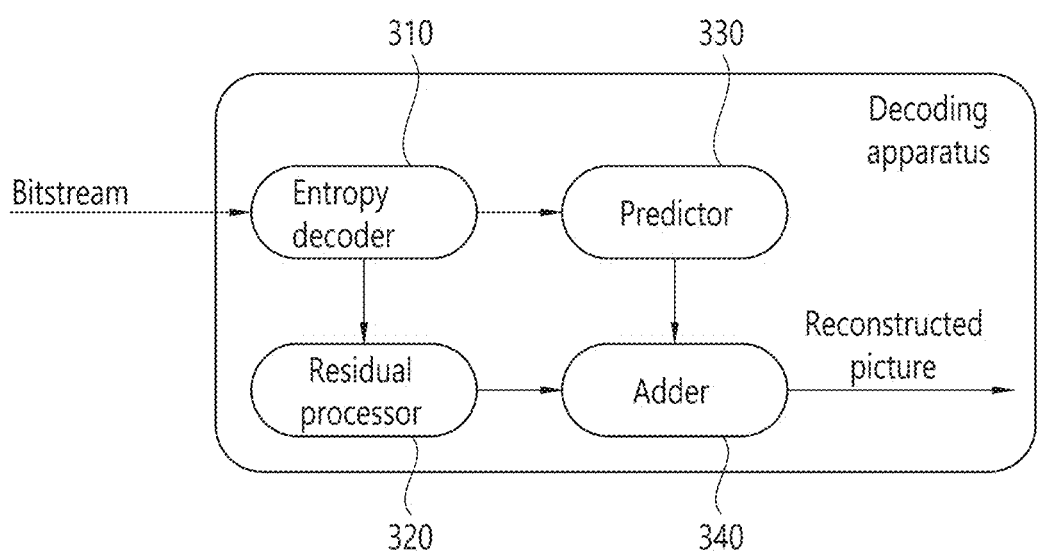

FIGS. 9 and 10 schematically illustrate examples of a video/image decoding method and related components according to an embodiment(s) of this document.

The method disclosed in FIG. 9 may be performed by the decoding apparatus 300 disclosed in FIG. 3. Specifically, steps S900 to S910 in FIG. 9 may be performed by the entropy decoder 310 disclosed in FIG. 3. Step S920 in FIG. 9 may be performed by the dequantizer 321 disclosed in FIG. 3. Step S930 in FIG. 9 may be performed by the inverse transformer 322 disclosed in FIG. 3. Step S940 in FIG. 9 may be performed by the adder 340 disclosed in FIG. 3. Furthermore, the method disclosed in FIG. 9 may be performed by including the embodiments described in this document. Accordingly, a detailed description of contents redundant with the aforementioned embodiments in FIG. 9 is omitted or simply given.

Referring to FIG. 9, the decoding apparatus may receive image information (or video information) from a bitstream (S900).

In an embodiment, the decoding apparatus may derive information (e.g., video/image information) necessary for an image reconstruction (or picture reconstruction) by parsing the bitstream. In this case, the image information may include residual information. The residual information may include information, such as value information, position information, a transform scheme, a transform kernel, or a quantization parameter of quantized transform coefficients. Furthermore, the image information may include information (e.g., prediction mode information) related to prediction. Furthermore, the image information may include information on scaling list data. That is, the image information may include various types of information necessary for a decoding process, and may be decoded based on based on a coding method, such as index Golomb encoding, CAVLC or CABAC.

In an embodiment, the image information may include various types of information according to the aforementioned embodiment(s) of this document, and may include information disclosed in at least one of Tables 1 to 47.

For example, the image information may include an adaptation parameter set (APS). The APS may include APS ID information and APS type information (type information of APS parameters). That is, the APS may be identified based on the APS ID information, and APS parameters corresponding to a corresponding type may be included in the APS based on the APS type information. For example, the APS type information may include an ALF type for adaptive loop filter (ALF) parameters, an LMCS type for luma mapping with chroma scaling (LMCS) parameters, and a scaling list type for scaling list data parameters, and may be illustrated as in Table 35. For example, when a value of the APS type information is 2, this may indicate that the APS type information is an APS including scaling list data parameters.

For example, the APS may be constructed like Table 33 (or Table 18). The APS ID information may be adaptation_parameter_set_id described in Table 33 and Table 34 (or Table 18 and Table 19). The APS type information may be aps_params_type described in Table 33 to Table 35 (or Table 18 to Table 20). For example, if the type information of APS parameters (e.g., aps_params_type) is a SCALING_APS type related to indicating an APS including scaling list data (or when a value of type information (e.g., aps_params_type) of APS parameters is 2), the APS may include scaling list data (e.g., scaling_list_data( )). That is, the decoding apparatus may obtain and parse the scaling list data (e.g., scaling_list_data( )) through the APS based on SCALING_APS type information related to indicating an APS including the scaling list data. That is, the scaling list data may be included in the APS based on the APS type information (SCALING_APS type information). The scaling list data, as described above, may include scaling list parameters for deriving a scaling list/scaling matrix/scale factor used in the quantization/dequantization process. In other words, the scaling list data may include syntax elements used to construct a scaling list.

Furthermore, for example, the APS ID information may have a value within a specific range. For example, a value of the APS ID information may have a value within a specific range from 0 to 3 or from 0 to 7. This has been merely described as an example, and the range of a value of the APS ID information may have different values. Furthermore, the range of a value of the APS ID information may be determined based on the APS type information (e.g., aps_params_type). If APS type information indicates an APS for scaling list data (e.g., SCALING_APS type), a value of APS ID information may be indicated based on a syntax element (e.g., slice_scaling_list_aps_id), such as that in Table 47. For example, if APS type information (e.g., aps_params_type) indicates an APS including scaling list data (e.g., in the case of the SCALING_APS type), a value of APS ID information may have a value within a range from 0 to 3 or 0 to 7. In this case, slices within one picture may refer to the same APS for scaling list data. Alternatively, if APS type information (e.g., aps_params_type) indicates an APS for an ALF (e.g., in the case of an ALF_APS type), a value of APS ID information may have a value within a range from 0 to 7. Alternatively, if APS type information (e.g., aps_params_type) indicates an APS for LMCS (e.g., in the case of an LMCS_APS type), a value of APS ID information may have a value within a range from 0 to 3.

Furthermore, for example, the image information may include a sequence parameter set (SPS). The SPS may include first enabled flag information related to indicating whether scaling list data is used. For example, the SPS may be constructed like Table 36 (or Table 21). The first enabled flag information may be scaling_list_enabled_flag described in Table 36 and Table 37 (or Table 21 and Table 22). Furthermore, a sps_scaling_list_data_present_flag syntax element may be removed from the SPS so that flag information is not parsed/signaled. The sps_scaling_list_data_present_flag syntax element may be information related to indicating whether a syntax structure of scaling list data is present in the SPS. Scaling list data designated by the SPS may be parsed/signaled based on the flag information. However, the sps_scaling_list_data_present_flag syntax element may be removed, and thus the SPS may be constructed to not directly signal the scaling list data and to explicitly signal only a scaling list-enabled flag (scaling_list_enabled_flag) in an SPS level.

Furthermore, for example, the image information may include a picture parameter set (PPS). For example, the PPS may be constructed like Table 38. In this case, the PPS may be constructed to not include enabled flag information related to indicating whether scaling list data is used. That is, the PPS may be constructed so that the flag information is not parsed/signaled by removing a pps_scaling_list_data_present_flag syntax element from the PPS. The pps_scaling_list_data_present_flag syntax element is flag information related to indicating whether a syntax structure of scaling list data is present in the PPS. Scaling list data designated by the PPS may be parsed/signaled based on the flag information. However, by removing the pps_scaling_list_data_present_flag syntax element, the scaling list data may not be directly signaled in a PPS level.

In this case, first enabled flag information (e.g., scaling_list_enabled_flag) related to indicating whether the scaling list data is used may be signaled in an SPS and may not be signaled in a PPS. Accordingly, scaling list data included in the APS may be obtained based on the first enabled flag information signaled in the SPS (e.g., when a value of the first enabled flag information (e.g., scaling_list_enabled_flag) is 1 or true).

Furthermore, for example, the image information may include header information. The header information may be header information related to a slice or picture including a current block, and may include a picture header or a slice header, for example. The header information may include scaling list data-related APS ID information. The scaling list data-related APS ID information included in the header information may indicate APS ID information for an APS including scaling list data. For example, the scaling list data-related APS ID information included in the header information may be slice_scaling_list_aps_id described in Table 40 to Table 41 (or Table 25 to Table 28), and may be ID information for an APS (including scaling list data, that is, SCALING LIST APS) referred by a slice/picture including a current block. That is, an APS including scaling list data may be identified based on scaling list data-related APS ID information (e.g., slice_scaling_list_aps_id) of the header information. That is, the decoding apparatus may identify an APS based on the APS ID information (e.g., slice_scaling_list_aps_id) of the header information, and may obtain scaling list data from the APS.

In this case, whether the header information parses/signals APS ID information for an APS including scaling list data may be determined based on the first enabled flag information (scaling_list_enabled_flag) parsed/signaled in the SPS. For example, the header information may include APS ID information for an APS including scaling list data based on the first enabled flag information related to indicating that a scaling list in an SPS is used (e.g., when a value of the first enabled flag information (e.g., scaling_list_enabled_flag) is 1 or true).

Furthermore, for example, the header information may include second enabled flag information related to indicating whether scaling list data in a picture or slice is used. For example, the second enabled flag information may be slice_scaling_list_present_flag (or slice_scaling_list_enabled_flag) described in Table 40 and Table 41 (or Table 25 to Table 28).

In this case, whether the header information parses/signals the second enabled flag information may be determined based on the first enabled flag information (scaling_list_enabled_flag) parsed/signaled in the SPS. For example, the header information may include the second enabled flag information based on the first enabled flag information related to indicating that a scaling list in the SPS is used (e.g., when a value of the first enabled flag information (e.g., scaling_list_enabled_flag) is 1 or true). Furthermore, the header information may include APS ID information for an APS including scaling list data based on the second enabled flag information (e.g., when a value of the second enabled flag information (e.g., slice_scaling_list_present_flag) is 1 or true).

For example, the decoding apparatus may obtain the second enabled flag information (e.g., slice_scaling_list_present_flag) through the header information based on the first enabled flag information (e.g., scaling_list_enabled_flag) signaled in the SPS as in Table 40 (or Table 25), and may then obtain the APS ID information (e.g., slice_scaling_list_aps_id) for the APS including scaling list data through the header information based on the second enabled flag information (e.g., slice_scaling_list_present_flag). Furthermore, the decoding apparatus may obtain scaling list data from an APS indicated by the APS ID information (e.g., slice_scaling_list_aps_id) obtained through the header information.

As described above, an SPS syntax and a PPS syntax may be constructed so that scaling list data syntax is not directly signaled in an SPS or PPS level. For example, only a scaling list-enabled flag (scaling_list_enabled_flag) may be explicitly signaled in an SPS. Thereafter, scaling list (scaling_list_data( )) may be individually parsed in a lower level syntax (e.g., an APS) based on an enabled flag (scaling_list_enabled_flag) in the SPS. Accordingly, according to an embodiment of this document, coding efficiency can be further improved because scaling list data can be parsed/signaled depending on a hierarchical structure.

The decoding apparatus may derive quantized transform coefficients for the current block based on the residual information (S910).

In an embodiment, the decoding apparatus may obtain the residual information included in the image information. The residual information, as described above, may include information, such as value information, position information, a transform scheme, a transform kernel, a quantization parameter of quantized transform coefficients. The decoding apparatus may derive the quantized transform coefficients for the current block based on the quantized transform coefficient information included in the residual information.

The decoding apparatus may derive the transform coefficients based on the quantized transform coefficients (S920).

In an embodiment, the decoding apparatus may derive the transform coefficients by applying a dequantization process for the quantized transform coefficients. In this case, the decoding apparatus may apply frequency weighting quantization that adjusts quantization intensity depending on a frequency. In this case, the dequantization process may be further performed based on a frequency-specific quantization scale value. The quantization scaling value for frequency weighting quantization may be derived using a scaling matrix. For example, the decoding apparatus may use a predefined scaling matrix, and may use the frequency-specific quantization scaling information for a scaling matrix signaled by the encoding apparatus. The frequency-specific quantization scaling information may include scaling list data. A (modified) scaling matrix may be derived based on the scaling list data.

That is, the decoding apparatus may further apply the frequency weighting quantization in performing the dequantization process. In this case, the decoding apparatus may derive the transform coefficients by applying the dequantization process for the quantized transform coefficients based on the scaling list data.

In an embodiment, the decoding apparatus may obtain an APS included in the image information, and may obtain the scaling list data based on APS type information included in the APS. For example, the decoding apparatus may obtain the scaling list data included in the APS, based on SCALING_APS type information related to indicating the APS including the scaling list data. In this case, the decoding apparatus may derive a scaling matrix based on the scaling list data, and may derive a scaling factor based on the scaling matrix, and may derive transform coefficients by applying dequantization based on the scaling factor. Such a process of performing scaling based on the scaling list data has been described in detail by taking Table 5 to Table 17 as examples, and thus in the present embodiment, redundant contents or a detailed description is omitted.

Furthermore, the decoding apparatus may determine whether to apply frequency weighting quantization (i.e., whether to derive the transform coefficients by using a scaling list in the dequantization process (frequency-based quantization)) in the dequantization process. For example, the decoding apparatus may determine whether to use the scaling list data, based on the first enabled flag obtained from the SPS included in the image information and/or the second enabled flag information obtained from the header information included in the image information. If it is determined that the scaling list data is used based on the first enabled flag and/or second enabled flag information, the decoding apparatus may obtain APS ID information for an APS including scaling list data through the header information, may identify a corresponding APS based on the APS ID information, and may obtain the scaling list data from the identified APS.

The decoding apparatus may derive residual samples based on the transform coefficients (S930).

In an embodiment, the decoding apparatus may derive residual samples of the current block by performing an inverse transform on transform coefficients for the current block. In this case, the decoding apparatus may obtain information (i.e., transform skip flag information) indicating whether to apply an inverse transform to the current block, and may derive the residual samples based on the information (i.e., transform skip flag information).

For example, if the inverse transform is not applied to the transform coefficients (when a value of transform skip flag information for the current block is 1), the decoding apparatus may derive the transform coefficients as the residual samples of the current block. Alternatively, if the inverse transform is applied to the transform coefficients (when a value of transform skip flag information for the current block is 0), the decoding apparatus may derive the residual samples of the current block by performing the inverse transform on the transform coefficients.

The decoding apparatus may generate reconstructed samples based on the residual samples (S940).

In an embodiment, the decoding apparatus may determine whether to perform inter prediction or intra prediction on the current block based on prediction information (e.g., prediction mode information) included in the image information, and may derive prediction samples for the current block by performing prediction based on the determination. Furthermore, the decoding apparatus may generate the reconstructed samples based on the prediction samples and the residual samples. In this case, the decoding apparatus may directly use the prediction samples as the reconstructed samples depending on a prediction mode, or may generate the reconstructed samples by adding the residual samples to the prediction samples. Furthermore, the decoding apparatus may derive a reconstructed block or a reconstructed picture based on the reconstructed samples. Thereafter, as described above, the decoding apparatus may apply an in-loop filtering procedure, such as deblocking filtering and/or SAO procedure, to the reconstructed picture in order to improve subjective/objective picture quality, if necessary.

In the above-described embodiments, the methods are explained on the basis of flowcharts by means of a series of steps or blocks, but the present disclosure is not limited to the order of steps, and a certain step may be performed in order or step different from that described above, or concurrently with another step. Further, it may be understood by a person having ordinary skill in the art that the steps shown in a flowchart are not exclusive, and that another step may be incorporated or one or more steps of the flowchart may be removed without affecting the scope of the present disclosure.

The above-described methods according to the present disclosure may be implemented as a software form, and an encoding apparatus and/or decoding apparatus according to the disclosure may be included in a device for image processing, such as, a TV, a computer, a smartphone, a set-top box, a display device or the like.

When embodiments in the present disclosure are embodied by software, the above-described methods may be embodied as modules (processes, functions or the like) to perform the above-described functions. The modules may be stored in a memory and may be executed by a processor. The memory may be inside or outside the processor and may be connected to the processor in various well-known manners. The processor may include an application-specific integrated circuit (ASIC), other chipset, logic circuit, and/or a data processing device. The memory may include a read-only memory (ROM), a random access memory (RAM), a flash memory, a memory card, a storage medium, and/or other storage device. That is, embodiments described in the present disclosure may be embodied and performed on a processor, a microprocessor, a controller or a chip. For example, function units shown in each drawing may be embodied and performed on a computer, a processor, a microprocessor, a controller or a chip. In this case, information for implementation (e.g., information on instructions) or an algorithm may be stored in a digital storage medium.

Furthermore, the decoding apparatus and the encoding apparatus to which this document is applied may be included in a multimedia broadcasting transmission and reception device, a mobile communication terminal, a home cinema video device, a digital cinema video device, a camera for monitoring, a video dialogue device, a real-time communication device such as video communication, a mobile streaming device, a storage medium, a camcorder, a video on-demand (VOD) service provision device, an over the top (OTT) video device, an Internet streaming service provision device, a three-dimensional (3D) video device, a virtual reality (VR) device, an augmented reality (AR) device, a video telephony device, transportation means terminal (e.g., a vehicle (including autonomous vehicle) terminal, an aircraft terminal, and a vessel terminal), and a medical video device, and may be used to process a video signal or a data signal. For example, the over the top (OTT) video device may include a game console, a Blueray player, Internet access TV, a home theater system, a smartphone, a tablet PC, and a digital video recorder (DVR).

Furthermore, the processing method to which this document is applied may be produced in the form of a program executed by a computer, and may be stored in a computer-readable recording medium. Multimedia data having a data structure according to this document may also be stored in a computer-readable recording medium. The computer-readable recording medium includes all types of storage devices in which computer-readable data is stored. The computer-readable recording medium may include Blueray disk (BD), a universal serial bus (USB), a ROM, a PROM, an EPROM, an EEPROM, a RAM, a CD-ROM, a magnetic tape, a floppy disk, and an optical data storage device, for example. Furthermore, the computer-readable recording medium includes media implemented in the form of carriers (e.g., transmission through the Internet). Furthermore, a bit stream generated using an encoding method may be stored in a computer-readable recording medium or may be transmitted over wired and wireless communication networks.

Furthermore, an embodiment of this document may be implemented as a computer program product using program code. The program code may be performed by a computer according to an embodiment of this document. The program code may be stored on a carrier readable by a computer.

Figure 11:
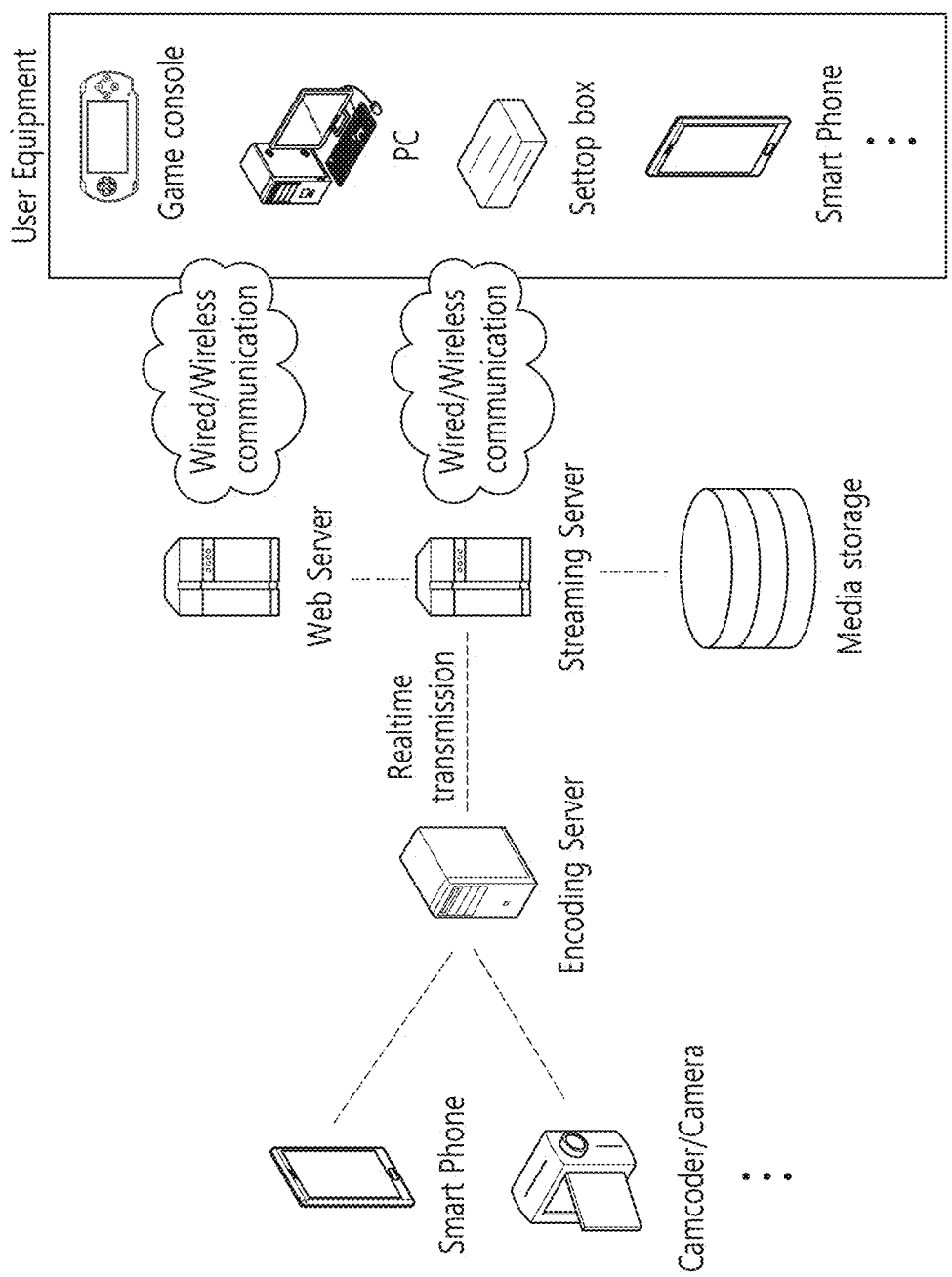
FIG. 11 illustrates an example of a content streaming system to which embodiments disclosed in this document may be applied.

FIG. 11 illustrates an example of a content streaming system to which embodiments disclosed in this document may be applied.

Referring to FIG. 11, the content streaming system to which the embodiments of the present document are applied may basically include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present document is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the content streaming system may be operated as a distributed server, in which case data received from each server may be distributed.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claims of the present specification and the technical features of the apparatus claims may be combined to be implemented as an apparatus, and the technical features of the method claims and the technical features of the apparatus claims of the present specification may be combined and implemented as a method.

What is claimed is:

1. A decoding apparatus for an image decoding, the decoding apparatus comprising:

a memory; and at least one processor connected to the memory, the at least one processor configured to:

obtain image information including residual information and prediction information from a bitstream;

derive prediction samples for a current block by performing a prediction based on the prediction information;

derive quantized transform coefficients for the current block based on the residual information;

derive transform coefficients based on the quantized transform coefficients and scaling list data;

derive residual samples based on the transform coefficients; and generate reconstruction samples based on the prediction samples and the residual samples, wherein the image information includes an adaptation parameter set (APS) including the scaling list data, wherein the APS includes APS ID information and APS type information, wherein the APS is identified based on the APS ID information, wherein the APS type information specifies whether the APS is for Adaptive loop filter (ALF), for Luma mapping with chroma scaling (LMCS), or for the scaling list data, wherein the APS includes the scaling list data based on the APS type information specifying that the APS is APS for the scaling list data, wherein the APS ID information has a value within a specific range based on the APS type information specifying that the APS is APS for the scaling list data, wherein the specific range is predetermined for the APS type information specifying that the APS is APS for the scaling list data, wherein the specific range for the value of the APS ID information includes a range of 0 to 3, and wherein the APS type information specifies that the APS is APS for the scaling list data based on a value of the APS type information being equal to 2.

2. An encoding apparatus for an image encoding, the encoding apparatus comprising:

a memory; and at least one processor connected to the memory, the at least one processor configured to:

derive prediction samples for a current block by performing a prediction;

derive residual samples for the current block based on the prediction samples;

derive transform coefficients based on the residual samples;

derive quantized transform coefficients by applying a quantization process for the transform coefficients;

generate prediction information based on the prediction;

generate residual information including information for the quantized transform coefficients; and encode image information including the prediction information and the residual information, wherein the image information includes an adaptation parameter set (APS) including scaling list data for the quantized transform coefficients, wherein the APS includes APS ID information and APS type information, wherein the APS is identified based on the APS ID information, wherein the APS type information specifies whether the APS is for Adaptive loop filter (ALF), for Luma mapping with chroma scaling (LMCS), or for the scaling list data, wherein the APS includes the scaling list data based on the APS type information specifying that the APS is APS for the scaling list data, wherein the APS ID information has a value within a specific range based on the APS type information specifying that the APS is APS for the scaling list data, wherein the specific range is predetermined for the APS type information specifying that the APS is APS for the scaling list data, wherein the specific range for the value of the APS ID information includes a range of 0 to 3, and wherein the APS type information specifies that the APS is APS for the scaling list data based on a value of the APS type information being equal to 2.

3. An apparatus for transmitting data for an image, the apparatus comprising:

at least one processor configured to obtain a bitstream for the image, wherein the bitstream is generated based on deriving prediction samples for a current block by performing a prediction, deriving residual samples for the current block based on the prediction samples, deriving transform coefficients based on the residual samples, deriving quantized transform coefficients by applying a quantization process for the transform coefficients, generating prediction information based on the prediction, generating residual information including information for the quantized transform coefficients, encoding image information including the prediction information and the residual information; and a transmitter configured to transmit the data comprising the bitstream, wherein the image information includes an adaptation parameter set (APS) including scaling list data for the quantized transform coefficients, wherein the APS includes APS ID information and APS type information, wherein the APS is identified based on the APS ID information, wherein the APS type information specifies whether the APS is for Adaptive loop filter (ALF), for Luma mapping with chroma scaling (LMCS), or for the scaling list data, wherein the APS includes the scaling list data based on the APS type information specifying that the APS is APS for the scaling list data, wherein the APS ID information has a value within a specific range based on the APS type information specifying that the APS is APS for the scaling list data, wherein the specific range is predetermined for the APS type information specifying that the APS is APS for the scaling list data, wherein the specific range for the value of the APS ID information includes a range of 0 to 3, and wherein the APS type information specifies that the APS is APS for the scaling list data based on a value of the APS type information being equal to 2.

* * * * *